United States Patent
Lee et al.

(10) Patent No.: US 11,517,821 B2
(45) Date of Patent: Dec. 6, 2022

(54) VIRTUAL REALITY CONTROL SYSTEM

(71) Applicant: SKONEC ENTERTAINMENT CO., LTD., Seoul (KR)

(72) Inventors: Who Jung Lee, Seoul (KR); Jae Young Kim, Namyangju-si (KR)

(73) Assignee: SKONEC ENTERTAINMENT CO., LTD., Seoul (KR)

(*) Notice: Subject to any disclaimer, the term of this patent is extended or adjusted under 35 U.S.C. 154(b) by 302 days.

(21) Appl. No.: 16/958,524

(22) PCT Filed: Dec. 26, 2018

(86) PCT No.: PCT/KR2018/016683
§ 371 (c)(1),
(2) Date: Jun. 26, 2020

(87) PCT Pub. No.: WO2019/132521
PCT Pub. Date: Jul. 4, 2019

(65) Prior Publication Data
US 2021/0065460 A1    Mar. 4, 2021

Related U.S. Application Data

(60) Provisional application No. 62/610,455, filed on Dec. 26, 2017.

(30) Foreign Application Priority Data

Aug. 21, 2018  (KR) .......................... 10-2018-0097682
Aug. 21, 2018  (KR) .......................... 10-2018-0097686
(Continued)

(51) Int. Cl.
G06T 19/20   (2011.01)
A63F 13/65   (2014.01)
(Continued)

(52) U.S. Cl.
CPC ............ *A63F 13/65* (2014.09); *A63F 13/212* (2014.09); *A63F 13/52* (2014.09);
(Continued)

(58) Field of Classification Search
CPC ........ A63F 13/65; A63F 13/212; A63F 13/52; A63F 13/5375; A63F 13/56; A63F 13/69;
(Continued)

(56) References Cited

U.S. PATENT DOCUMENTS 5,615,132 A   3/1997   Horton et al.
5,659,691 A   8/1997   Durward et al.
(Continued)

FOREIGN PATENT DOCUMENTS

EP    2579128 B1    11/2017
JP    09-503082 A    3/1997
(Continued)

OTHER PUBLICATIONS

KR Office Action dated Sep. 16, 2019 as received in Application No. 10-2018-0097683.
(Continued)

*Primary Examiner* — David L Lewis
*Assistant Examiner* — Shauna-Kay Hall
(74) *Attorney, Agent, or Firm* — Maschoff Brennan

(57) ABSTRACT

Provided is a virtual environment control system for providing a virtual image related to at least part of virtual environment to a player who plays in a plurality of divided spaces through a wearable display device which the player is wearing, including: at least one first detecting device getting first detecting data related to a first play space; at least one second detecting device getting second detecting data related to a second play space; at least one auxiliary computing device generating a first virtual image and a second virtual image; a first wearable display device dis-
(Continued)

playing the first virtual image to a first player located in the first play space; a second wearable display device displaying the second virtual image to a second player located in the second play space.

11 Claims, 35 Drawing Sheets

(30) Foreign Application Priority Data

Aug. 21, 2018 (KR) .................. 10-2018-0097687
Dec. 21, 2018 (KR) .................. 10-2018-0167749

(51) Int. Cl.

| | |
|---|---|
| *A63F 13/212* | (2014.01) |
| *A63F 13/56* | (2014.01) |
| *G02B 27/01* | (2006.01) |
| *A63F 13/52* | (2014.01) |
| *A63F 13/5375* | (2014.01) |
| *A63F 13/69* | (2014.01) |
| *A63F 13/837* | (2014.01) |
| *G06F 3/01* | (2006.01) |
| *G06T 19/00* | (2011.01) |
| *A63F 13/847* | (2014.01) |

(52) U.S. Cl.
CPC .......... *A63F 13/5375* (2014.09); *A63F 13/56* (2014.09); *A63F 13/69* (2014.09); *A63F 13/837* (2014.09); *G02B 27/017* (2013.01); *G06F 3/011* (2013.01); *G06T 19/006* (2013.01); *G06T 19/20* (2013.01); *A63F 13/847* (2014.09); *A63F 2300/575* (2013.01); *A63F 2300/8082* (2013.01)

(58) Field of Classification Search
CPC ............... A63F 13/837; A63F 13/847; A63F 2300/575; A63F 2300/8082; A63F 13/213; A63F 2300/1087; G02B 27/017; G06F 3/011; G06F 3/017; G06F 3/0346; G06T 19/006; G06T 19/20; G06T 19/003; G06T 13/40; G06T 13/213; G06V 40/16
See application file for complete search history.

(56) References Cited

U.S. PATENT DOCUMENTS

| | | | | |
|---|---|---|---|---|
| 6,760,050 | B1 * | 7/2004 | Nakagawa | ............... H04S 1/002 715/848 |
| 7,292,240 | B2 | 11/2007 | Okuno et al. | |
| 9,599,821 | B2 | 3/2017 | Van Curen et al. | |
| 9,983,697 | B1 | 5/2018 | Gribetz | |
| 9,984,510 | B1 | 5/2018 | Kinstner et al. | |
| 2006/0050069 | A1 | 3/2006 | Okuno et al. | |
| 2007/0202946 | A1 | 8/2007 | Matsuyama | |
| 2009/0286600 | A1 * | 11/2009 | Hideya | ............... H04S 7/301 463/43 |
| 2010/0022305 | A1 * | 1/2010 | Yano | ............... A63F 13/577 463/36 |
| 2011/0225069 | A1 | 9/2011 | Cramer et al. | |
| 2013/0293677 | A1 | 11/2013 | Lee et al. | |
| 2014/0135117 | A1 * | 5/2014 | Abe | ............... A63F 13/26 463/31 |
| 2014/0218361 | A1 * | 8/2014 | Abe | ............... A63F 13/42 345/424 |
| 2014/0221090 | A1 | 8/2014 | Mutschler et al. | |
| 2014/0306866 | A1 | 10/2014 | Miller et al. | |
| 2015/0116316 | A1 * | 4/2015 | Fitzgerald | ............... G06F 3/012 345/419 |
| 2015/0190716 | A1 | 7/2015 | Evertt et al. | |
| 2015/0234462 | A1 | 8/2015 | Miller et al. | |
| 2015/0234463 | A1 | 8/2015 | Miller et al. | |
| 2015/0235429 | A1 | 8/2015 | Miller et al. | |
| 2015/0235433 | A1 | 8/2015 | Miller et al. | |
| 2015/0235434 | A1 | 8/2015 | Miller et al. | |
| 2015/0235435 | A1 | 8/2015 | Miller et al. | |
| 2015/0235610 | A1 | 8/2015 | Miller et al. | |
| 2016/0041391 | A1 | 2/2016 | Van Curen et al. | |
| 2017/0001818 | A1 | 1/2017 | Osakabe et al. | |
| 2018/0015375 | A1 | 1/2018 | Marino | |
| 2018/0143429 | A1 | 5/2018 | Gibbs et al. | |
| 2018/0149864 | A1 | 5/2018 | Gibbs et al. | |
| 2018/0210627 | A1 | 7/2018 | Woo et al. | |
| 2018/0250595 | A1 | 9/2018 | Kurabayashi | |
| 2018/0288119 | A1 | 10/2018 | Lee et al. | |
| 2019/0155484 | A1 | 5/2019 | Chu | |
| 2019/0362564 | A1 | 11/2019 | Shen et al. | |
| 2020/0043242 | A1 * | 2/2020 | Hu | ............... G06F 3/0346 |
| 2020/0051336 | A1 * | 2/2020 | Ichikawa | ............... G06T 19/006 |
| 2020/0368616 | A1 * | 11/2020 | Delamont | ............... A63F 13/213 |

FOREIGN PATENT DOCUMENTS

| | | | |
|---|---|---|---|
| JP | 10-283151 | A | 10/1998 |
| JP | 2002-149581 | A | 5/2002 |
| JP | 2002149581 | A * | 5/2002 |
| JP | 2003-271992 | A | 9/2003 |
| JP | 2006-079174 | A | 3/2006 |
| JP | 2010-068872 | A | 4/2010 |
| JP | 2017-086215 | A | 5/2017 |
| JP | 2018-018147 | A | 2/2018 |
| KR | 10-2006-0127255 | A | 12/2006 |
| KR | 10-2012-0084252 | A | 7/2012 |
| KR | 10-2014-0033088 | A | 3/2014 |
| KR | 10-2014-0083015 | A | 7/2014 |
| KR | 10-2015-0106772 | A | 9/2015 |
| KR | 10-2016-0018436 | A | 2/2016 |
| KR | 10-2016-0068361 | A | 6/2016 |
| KR | 10-1666561 | B1 | 10/2016 |
| KR | 10-2016-0135652 | A | 11/2016 |
| KR | 10-2017-0033340 | A | 3/2017 |
| KR | 10-2017-0069790 | A | 6/2017 |
| WO | 2014/164901 | A1 | 10/2014 |

OTHER PUBLICATIONS

KR Office Action dated Sep. 16, 2019 as received in Application No. 10-2018-0097684.
KR Office Action dated Oct. 8, 2019 as received in Application No. 10-2018-0097682.
KR Office Action dated Oct. 30, 2019 as received in Application No. 10-2018-0167749.
KR Decision to Grant dated Feb. 18, 2020 as received in Application No. 10-2018-0097683.
KR Decision to Grant dated Feb. 18, 2020 as received in Application No. 10-2018-0097684.
KR Decision to Grant dated Mar. 3, 2020 as received in Application No. 10-2018-0097685.
KR Office Action dated Jan. 14, 2020 as received in Application No. 10-2018-0097686.
KR Office Action dated Apr. 14, 2020 as received in Application No. 10-2018-0097687.
KR Notice of Allowance in Application No. 10-2018-0097687 dated Nov. 4, 2020.
KR Office Action in Application No. 10-2018-0097686 dated Aug. 15, 2020.
KR Office Action in Application N. 10-2018-0097686 dated Jun. 29, 2020.
KR Office Action in Application No. 10-2018-0097687 dated Sep. 8, 2020.
KR Office Action in Application No. 10-2018-0167749 dated Jul. 30, 2020.
"R Cake baking games" (Nov. 1, 2017) https://www.youtube.com/watch?v=e5BII7R-nYs.
"Tower Tag—a PvP Shooter made for VR Arcades" (Mar. 20, 2017) https://www.youtube.com/watch?v=Fg8XobTnvOg.

(56) References Cited

OTHER PUBLICATIONS

"Serious Sam VR : The Last Hope"(Jan. 3, 2017) https://www.youtube.com/watch?v=GOgTcUApAxM.
Office Action from U.S. Appl. No. 16/958,545, filed Dec. 2, 2021.
Office Action from U.S. Appl. No. 16/958,545, filed Mar. 11, 2022.

\* cited by examiner

FIG. 14
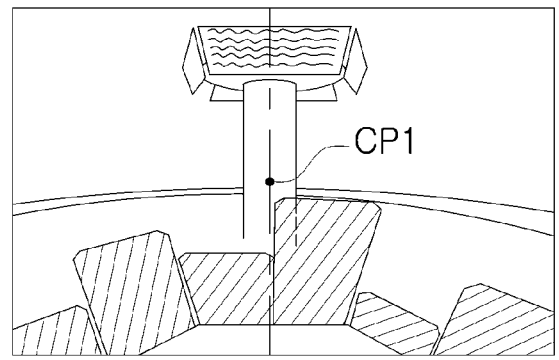
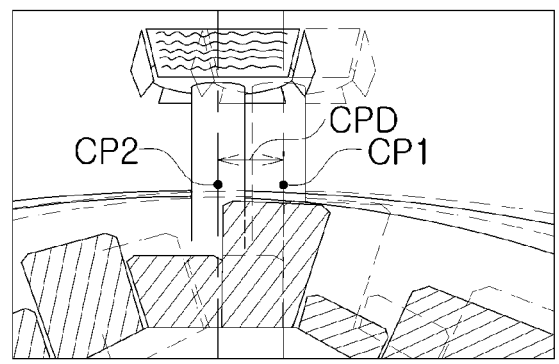
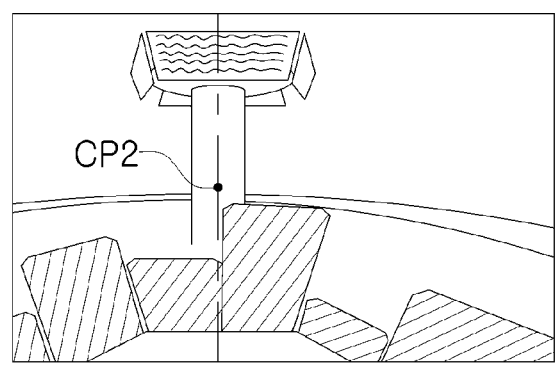

VIRTUAL REALITY CONTROL SYSTEM

TECHNICAL FIELD

The present invention relates to a virtual environment control system.

BACKGROUND ART

Virtual environment is a technology that provides a user with an arbitrary world implemented through a program, unlike the real world.

Conventionally, such virtual environment has been provided through a display, such as a monitor, which is independently provided, spaced apart from a user. However, recently, technologies, such as a virtual reality (VR) device, an augmented reality (AR) device, and a mixed reality (MR) device, which provide a virtual environment to a user at a position close to the user's eyes by being directly worn on a user's head, have been developed.

When the virtual environment is provided, a user who wears a wearable display device conventionally sits or stands in a fixed position to play, but recently the technology has evolved to an extent that the user can play in a virtual environment in a predefined space.

When a space-based virtual environment is provided, only one virtual environment is typically provided within a single space such that there is a limitation in accommodating players and there is a problem in that players located in different spaces cannot share the virtual environment.

DISCLOSURE

Technical Problem

One object of the present invention is to provide a virtual environment control system capable of providing the same virtual environment to a plurality of players playing in different spaces.

Another object of the present invention is to provide a virtual environment control system which converts interactions between players playing in different spaces in the real world into interactions in a virtual environment and provides the interactions to the players.

Objects of the present invention may not be limited to the above, and other objects will be clearly understandable to those having ordinary skill in the art from the disclosures provided below together with accompanying drawings.

Technical Solution

One aspect of the present invention provides a virtual reality control system for providing a virtual image related to at least part of virtual environment to a player who plays in a plurality of divided spaces through a wearable display device which the player is wearing, including: at least one first detecting device getting first detecting data related to a first play space; at least one second detecting device getting second detecting data related to a second play space; at least one auxiliary computing device generating a first virtual image and a second virtual image; a first wearable display device displaying the first virtual image to a first player located in the first play space; a second wearable display device displaying the second virtual image to a second player located in the second play space, wherein the auxiliary computing device is getting a first reality position data related to the first player based on the first detecting data, getting a first virtual position data, which is position data in virtual environment corresponding to the first player, based on reality position data of the first player, getting a second reality position data related to the second player based on the second detecting data, and getting a second virtual position data, which is position data in virtual environment corresponding to the second player, based on reality position data of the second player, wherein the first virtual image is related to an area corresponding to a field of view of a location determined based on the first virtual position data in the virtual environment, and wherein the second virtual image is related to an area corresponding to a field of view of a location determined based on the second virtual position data in the virtual environment.

Another aspect of the present invention provides a wearable display device for providing a virtual image related to at least part of virtual environment to a player who plays in a plurality of divided spaces, including: a communicator getting data about another player; a display displaying a virtual image to the player; and a controller controlling an output of the virtual image of the display, wherein the virtual image displayed through the display includes an image related to a first virtual area corresponding to a first play space where the player wearing the wearable display device plays and an image related to a second virtual area corresponding to a second play space where at least one other player except the player plays.

Technical solutions of the present invention may not be limited to the above, and other technical solutions of the present invention will be clearly understandable to those having ordinary skill in the art from the disclosures provided below together with accompanying drawings.

Advantageous Effects

According to one aspect, it is possible to provide the same virtual environment to a plurality of players playing in different spaces.

According to another aspect, it is possible to convert interactions between players playing in different spaces in the real world into interactions in a virtual environment and provide the converted interactions.

Effects of the present invention may not be limited to the above, and other effects of the present invention will be clearly understandable to those having ordinary skill in the art from the disclosures provided below together with accompanying drawings.

DESCRIPTION OF DRAWINGS

FIG. 14 is a diagram illustrating correction of a virtual image according to the above-described method of matching rotational delays.

MODES OF THE INVENTION

Figure 1:
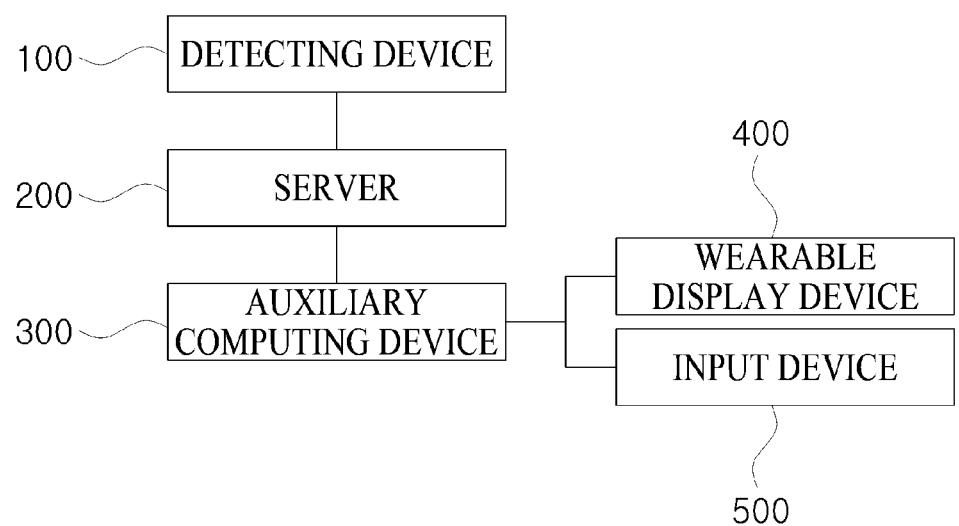
FIG. 1 is a diagram illustrating an environment of a system according to one embodiment.

The above purpose, characteristics, and advantages of the present invention will now be described more fully with reference to the accompanying drawings. The invention may, however, be embodied in many different forms and in description that follows, particular embodiments of the invention are illustrated in the accompanying drawings and described in detail.

In the drawings, the thicknesses of layers and regions are exaggerated for clarity. It will also be understood that when a layer is referred to as being "on" another layer or substrate, it can be directly on another layer or substrate, or intervening layers may also be present. Further, like reference numerals will be used to designate like components having similar functions throughout the drawings within the scope of the present disclosure.

Detailed descriptions of related well-known functions that are determined to unnecessarily obscure the gist of the present invention will be omitted. While the terms including an ordinal number, such as "first," "second," etc., may be used to describe various components, such components are not be limited by these terms. The terms first and second should not be used to attach any order of importance but are used to distinguish one element from another element.

Further, in the following description, usage of terms, such as "module," and "unit" used for referring to elements is given merely to facilitate explanation of the present invention, without having any significant meaning by itself.

Unlike the real world, a virtual environment may be an artificial environment created by a program.

Such a virtual environment may be generally classified into a virtual reality (VR) that creates a virtual space separated from reality with a program and provides an image of the virtual space, an augmented reality (AR) that provides a single image by superimposing virtual images on the real world, and a mixed reality (MR) that provides a virtual space by mixing the real world and a virtual environment and provides an image of the virtual space.

In describing a virtual environment hereinafter, the virtual environment may mean an environment that provides various types of virtual spaces, as well as the above-described VR, AR, and MR.

Hereinafter, a system for providing virtual reality according to one embodiment will be described with reference to FIG. 1.

FIG. 1 is a diagram illustrating an environment of a system according to one embodiment.

Referring to FIG. 1, the system may include a detecting system 100, a server 200, an auxiliary computing device 300, a wearable display device 400, and an input device 500.

According to one embodiment, the detecting system 100 may be connected to the server 200.

The detecting system 100 may acquire detecting data by tracking a target object.

The target object according to one embodiment may be an object that affects an image output through the wearable display device 400.

For example, the target object may include at least one of a body part of a player, the wearable display device 400, a user, the input device 500, an object located near the user, and an object having a reference point or a characteristic point.

In addition, the tracking of the target object according to one embodiment may mean acquiring of data on a position of the target object in a real environment.

For example, by tracking the target object, data on a position that changes according to movement of the target object in the real environment may be acquired. The position data of the target object may be acquired at predetermined intervals but is not limited thereto.

According to one embodiment, the detecting system 100 may provide the detecting data to the server 200.

According to one embodiment, the server 200 may be connected to the detecting system 1000 and the auxiliary computing device 300.

The server 200 may acquire data from the devices connected thereto.

According to one embodiment, the server 200 may acquire at least one of detecting data, image data acquired by the detecting system 100, and state data of the detecting system 100 from the detecting system 100.

In addition, the server 200 may acquire a variety of data according to some embodiments described below.

According to one embodiment, the server 200 may control the devices connected thereto.

According to one embodiment, the server 200 may control the auxiliary computing device 300 or the wearable display device 400.

In one example, the server 200 may control driving of an application installed in the auxiliary computing device 300. More specifically, the server 200 may control start and/or termination of the application installed in the auxiliary computing device 300.

In another example, the server 200 may provide various settings necessary for operation of the detecting system 100.

In addition, the server 200 may generate virtual position data which indicates a position of the target object in a virtual environment on the basis of the detecting data.

Also, the server 200 may perform authentication of the application executed on the auxiliary computing device 300.

The functions of the server 200 according to one embodiment are not limited to the above-described functions, and the server 200 which performs various functions may be provided according to some embodiments.

In addition, the server 200 according to one embodiment is not necessarily provided as a single physical device and may be provided as a plurality of devices that perform individual functions which are subdivided from the above-described functions.

For example, the server 200 may be divided into a detecting server connected to the detecting system 100 and configured to acquire virtual position data on the basis of the detecting data, an operation server configured to control at least a part of devices provided to the system, and a license server configured to perform authentication of an application executed on at least one device among the devices of the system, and relevant functions may be performed by the respective servers.

The auxiliary computing device 300 may be connected to at least one of the server 200, the wearable display device 400, and the input device 500.

The auxiliary computing device 300 may provide an image to be provided to the user via the wearable display device 400 through a pre-installed application.

In addition, the auxiliary computing device 300 may provide sound data to be provided via the wearable display device 400.

According to one embodiment, the auxiliary computing device 300 may acquire an image to be provided to the user on the basis of a pre-installed program and the detecting data.

In addition, the auxiliary computing device 300 may acquire input data on the basis of an input signal acquired from the input device 500.

The input data may include selection data of the user regarding an object and the like, data related to a motion input via the input device 500, and orientation data related to an orientation direction of the input device 500.

In addition, the auxiliary computing device 300 may acquire an image to be provided to the user by taking into account the acquired input data.

According to one embodiment, the auxiliary computing device 300 may be provided in the form of a backpack personal computer (PC) wearable by a player P.

In one example, the auxiliary computing device 300 may be provided in a form coupled to a bag in which the auxiliary computing device 300 may be accommodated and may be provided in a form that allows the player P to carry the auxiliary computing device 300 by wearing the bag.

The wearable display device 400 may be connected to the auxiliary computing device 300.

The wearable display device 400 may provide an image of a virtual reality to the user.

The wearable display device 400 may visually output the virtual image acquired from the auxiliary computing device 300 to the user.

In addition, the wearable display device 400 may output the sound data acquired from the auxiliary computing device 300.

The input device 500 may acquire a signal related to a user's input to be reflected in the virtual reality.

The input device 500 may be connected to the auxiliary computing device 300.

The input device 500 may provide an input signal that corresponds to the user's input to the auxiliary computing device 300.

The input device 500 may include an acceleration sensor, a gyroscope, a gyro sensor, microelectromechanical systems (MEMS), a geomagnetic sensor, an inertial sensor (IMIU), an optical sensor, an illuminance sensor, a photo sensor, an infrared sensor, a color sensor, a depth sensor, an electromagnetic wave sensor, and the like for acquiring a signal corresponding to movement of the user.

In addition, the input device 500 may include a button, a switch, a jog shuttle, a wheel, and the like for acquiring a signal related to the user's selection.

In addition, the input device 500 may be connected to the auxiliary computing device 300 through at least one of wired communication and wireless communication.

Also, the input device 500 may include a communication module for communicating with the auxiliary computing device 300.

FIG. 1 illustrates that the input device 500 is connected to the auxiliary computing device 300, but the embodiment is not limited thereto, and the input device 500 may be provided in various connection forms according to the selection.

For example, the input device 500 may be connected to devices, such as the server 200 and the wearable display device 400, to provide an input signal thereto.

The above-described system is merely an example for convenience of description. The system according to one embodiment is not limited to the configuration and connection relationship shown in FIG. 1 and may be provided in various forms according to the selection.

In one example, the auxiliary computing device 300 and the wearable display device 400 may be provided in one device, and in this case, operations performed in the auxiliary computing device 300 may be implemented in the wearable display device 400.

However, in the following description of the various embodiments, the above-described system will be described as an example for convenience of description.

Hereinafter, the detecting system 100 according to one embodiment will be described with reference to FIG. 2.

Figure 2:
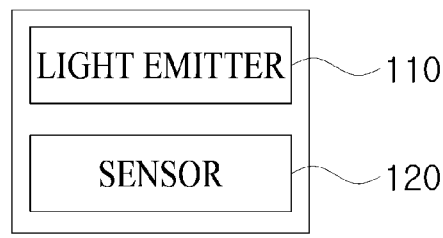
FIG. 2 is a block diagram illustrating a detecting system according to one embodiment.

FIG. 2 is a block diagram illustrating a detecting system according to one embodiment.

Referring to FIG. 2, the detecting system 100 may include a light emitter 110 and a sensor 120.

The light emitter 110 may project a signal to the target object or to the vicinity of the target object for tracking.

In one example, the light emitter 110 may be provided as a light-emitting device that projects an optical signal, such as visible light, infrared light, or the like.

More specifically, the light emitter may be provided as a visible-light light-emitting diode (LED), an infrared LED, or the like.

The sensor 120 may acquire a signal from an external source.

In one example, the sensor 120 may acquire a signal corresponding to the signal projected by the light emitter 110.

In another example, the sensor 120 may acquire a signal related to light reflected by a marker M provided on the target object.

For example, the sensor 120 may be provided as an image sensor, an optical sensor, an illuminance sensor, a photo sensor, an infrared sensor, a color sensor, a depth sensor, an electromagnetic wave sensor, or the like.

Figure 3:
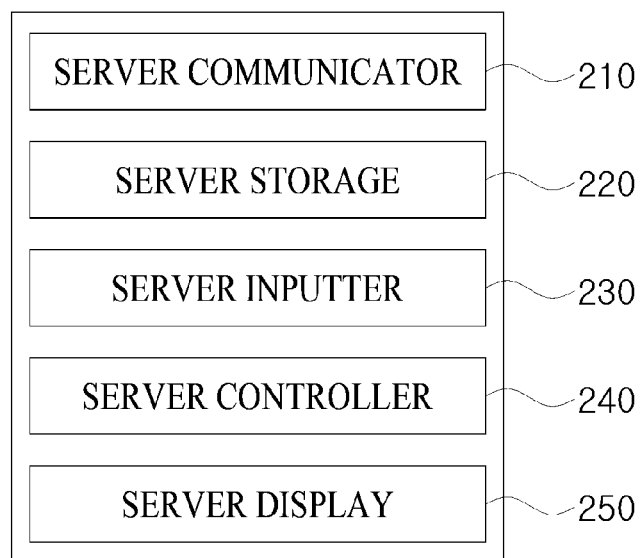
FIG. 3 is a block diagram illustrating a server according to one embodiment.

FIG. 3 is a block diagram illustrating the server 200 according to one embodiment.

Referring to FIG. 3, the server 200 may include a server communicator 210, a server storage 220, a server inputter 230, a server controller 240, and a server display 250.

The server communicator 210 may be connected to at least one of the detecting system 100, the auxiliary computing device 300, and the wearable display device 400 and acquire or provide data therefrom or thereto.

The server communicator 210 may be connected to at least one of the detecting system 100, the auxiliary computing device 300, and the wearable display device 400 through at least one of wired communication and wireless communication.

For example, the wireless communication may include a mobile communication network, such as a Wi-Fi network, a $3^{rd}$ generation (3G) network, a long-term evolution (LTE) network, a 5G network, and Long Range (LoRA), wireless access in vehicular environment (WAVE), beacon, ZigBee, Bluetooth, Bluetooth low energy, or the like.

In addition, the wired communication may include a twisted-pair cable, a coaxial cable, an optical fiber cable, or the like.

The server communicator 210 may be provided as a communication module for providing at least one of the wired communication and the wireless communication.

The server storage 220 may store data therein.

The server storage 220 may store data acquired from an external source.

In addition, the server storage 220 may store data necessary for operation of the server 200.

For example, the server storage 220 may be provided as a hard disk, a floppy disk, a magnetic medium such as magnetic tape, an optical medium such as a compact disc read only memory (CD-ROM), a digital versatile disc, or the like, a magneto-optical medium such as a floptical disk, a read only memory (ROM), a random access memory (RAM), a flash memory, a solid state drive (SSD), a CD-ROM, a DVD-ROM, a Universal Serial Bus (USB), or the like.

The server inputter 230 may acquire a signal corresponding to an input of the user.

The input of the user may be, for example, a press, a click, a touch, or a drag of a button.

The server inputter 230 may be implemented as, for example, a keyboard, a key pad, a jog shuttle, or a wheel.

The server controller 240 may control an overall operation of the server 200.

In one example, the server controller 240 may control the operation of a component included in the server 200.

The server controller 240 may be implemented as, for example, a microprocessor, a microcontroller, a digital signal processor (DSP), a processor, or an electrical unit for performing a controller function.

In addition, when the server controller 240 is implemented in software, embodiments, such as procedures and functions, may be implemented together with a separate software module that allows at least one function or operation to be performed. Software code may be implemented by a software application made using a suitable programming language. In addition, the software code may be stored in the server storage 220 and may be executed by the server controller 240 or an element included therein.

The server display 250 may output visual data.

The server display 250 may be provided as a monitor, a TV, a display panel, or the like, which outputs visual data.

In addition, when the server display 250 is provided as a touch screen, the server display 250 may perform a function of the server inputter 230.

Figure 4:
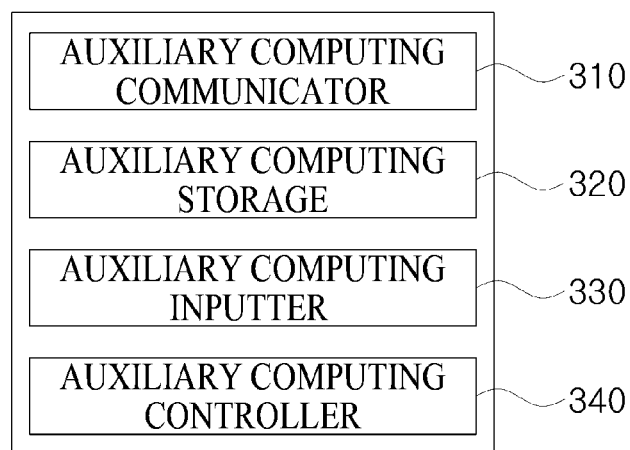
FIG. 4 is a block diagram illustrating an auxiliary computing device according to one embodiment.

FIG. 4 is a block diagram illustrating the auxiliary computing device 300 according to one embodiment.

Referring to FIG. 4, the auxiliary computing device 300 may include an auxiliary computing communicator 310, an auxiliary computing storage 320, an auxiliary computing inputter 330, and an auxiliary computing controller 340.

The auxiliary computing communicator 310 may be connected to at least one of the server 200, the wearable display device 400, and the input device 500.

The auxiliary computing communicator 310 may be connected to at least one of the server 200, the wearable display device 400 and the input device 500 through at least one of wired communication and wireless communication.

The auxiliary computing communicator 310 may exchange data with at least one of the connected server 200, the connected wearable display device, and the connected input device 500.

For example, the wireless communication may include a mobile communication network, such as a Wi-Fi network, a 3G network, an LTE network, a 5G network, and LoRA, WAVE, beacon, ZigBee, Bluetooth, Bluetooth low energy, and the like.

In addition, the wired communication may include a twisted-pair cable, a coaxial cable, an optical fiber cable, or the like.

The auxiliary computing communicator 310 may be provided as a communication module for providing at least one of the wired communication and the wireless communication.

The auxiliary computing storage 320 may store data acquired from an external source.

In addition, the auxiliary computing storage 320 may store data necessary for operation of the auxiliary computing device 300.

The auxiliary computing inputter 330 may acquire a signal corresponding to an input of a player.

The input of the player may be, for example, a press, a click, a touch, or a drag of a button.

For example, the auxiliary computing inputter 330 may be implemented as, for example, a keyboard, a key pad, a jog shuttle, or a wheel.

The auxiliary computing controller 340 may control an overall operation of the auxiliary computing device 300.

The auxiliary computing controller 340 may be implemented as, for example, a microprocessor, a microcontroller, a DSP, a processor, or an electrical unit for performing a controller function.

In addition, when the auxiliary computing controller 340 is implemented in software, embodiments, such as procedures and functions, may be implemented together with a separate software module that allows at least one function or operation to be performed. Software code may be implemented by a software application made using a suitable programming language. In addition, the software code may be stored in the server storage 220 and may be executed by the server storage 240 or an element included therein.

Figure 5:
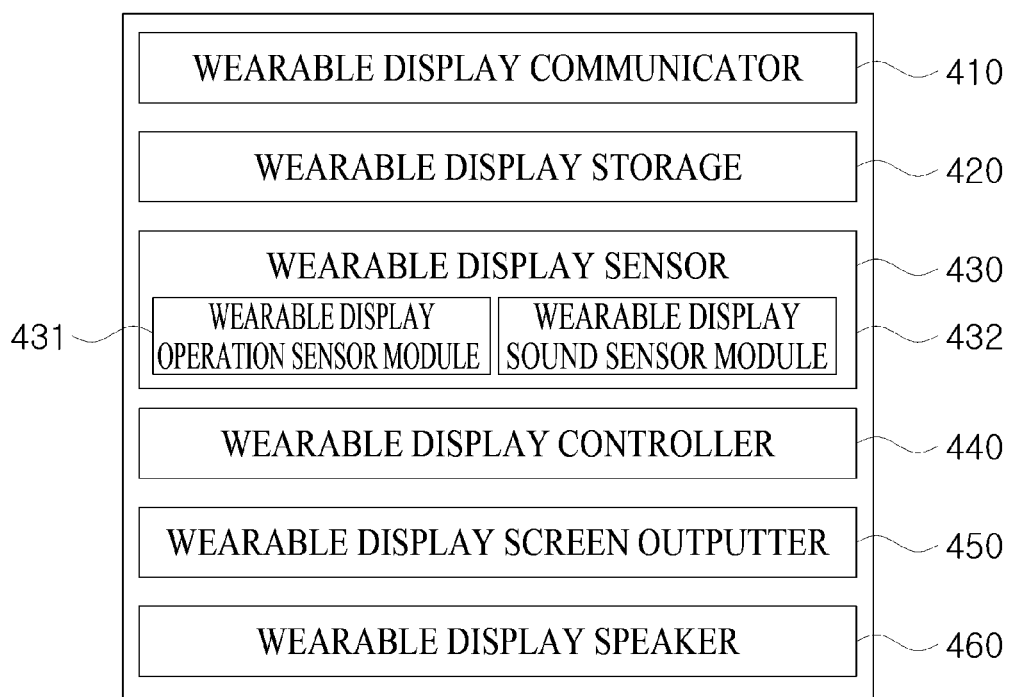
FIG. 5 is a diagram illustrating a wearable display device according to one embodiment.

FIG. 5 is a diagram illustrating the wearable display device 400 according to one embodiment.

Referring to FIG. 5, the wearable display device 400 may include a wearable display communicator 410, a wearable display storage 420, a wearable display sensor 430, a wearable display controller 440, a wearable display screen outputter 450, and a wearable display speaker 460.

The wearable display communicator 410 may be connected to the auxiliary computing device 300.

The wearable display communicator 410 may be connected to the auxiliary computing device 300 through at least one of wired communication and wireless communication.

The wearable display storage 420 may store data therein.

The wearable display storage 420 may store data necessary for operation of the wearable display device 400.

In addition, the wearable display storage 420 may store data acquired from an external source.

The wearable display sensor 430 may acquire a state of the wearable display device 400 and a signal corresponding to an input of the user.

The wearable display sensor 430 according to one embodiment may include a wearable display operation sensor module 431 and a wearable display sound sensor module 432.

The wearable display operation sensor module 431 may acquire a signal related to a state of the wearable display device 400.

In one example, the wearable display operation sensor module 431 may acquire rotation data related to a rotation of the wearable display device 400.

In another example, the wearable display operation sensor module 431 may acquire movement data related to a position movement of the wearable display device 400.

The wearable display operation sensor module 431 may include an acceleration sensor, a gyroscope, a gyro sensor, MEMS, a geomagnetic sensor, an inertial sensor (IMIU), an optical sensor, an illuminance sensor, a photo sensor, an infrared sensor, a color sensor, a depth sensor, an electromagnetic wave sensor, and the like.

The wearable display sound sensor module 432 may acquire a signal corresponding to a sound entering from outside.

In one example, the wearable display sound sensor module 432 may be a microphone.

The wearable display controller 440 may control an overall operation of the wearable display device 400.

The wearable display controller 440 may be implemented as, for example, a microprocessor, a microcontroller, a DSP, a processor, or an electrical unit for performing a controller function.

In addition, when the wearable display controller 440 is implemented in software, embodiments, such as procedures and functions, may be implemented together with a separate software module that allows at least one function or operation to be performed. Software code may be implemented by a software application made using a suitable programming language. In addition, the software code may be stored in the server storage 220 and may be executed by the server storage 240 or an element included therein.

The wearable display screen outputter 450 may output visual data to the user.

In one example, the wearable display screen outputter 450 may output an image of virtual reality. In another example, the wearable display screen outputter 450 may output an image of a three-dimensional (3D) virtual reality.

The wearable display screen outputter 450 may be provided as an image outputting device, such as a liquid crystal display (LCD), electronic paper, an LED display, organic liquid crystal display (OLED), a curved display, a stereoscopy (a 3D display using binocular disparity), or the like.

The wearable display speaker 460 may output auditory data.

The wearable display speaker 460 may be provided as a sound device, such as a tuner, a player, an amplifier, a speaker, or the like.

Figure 6:
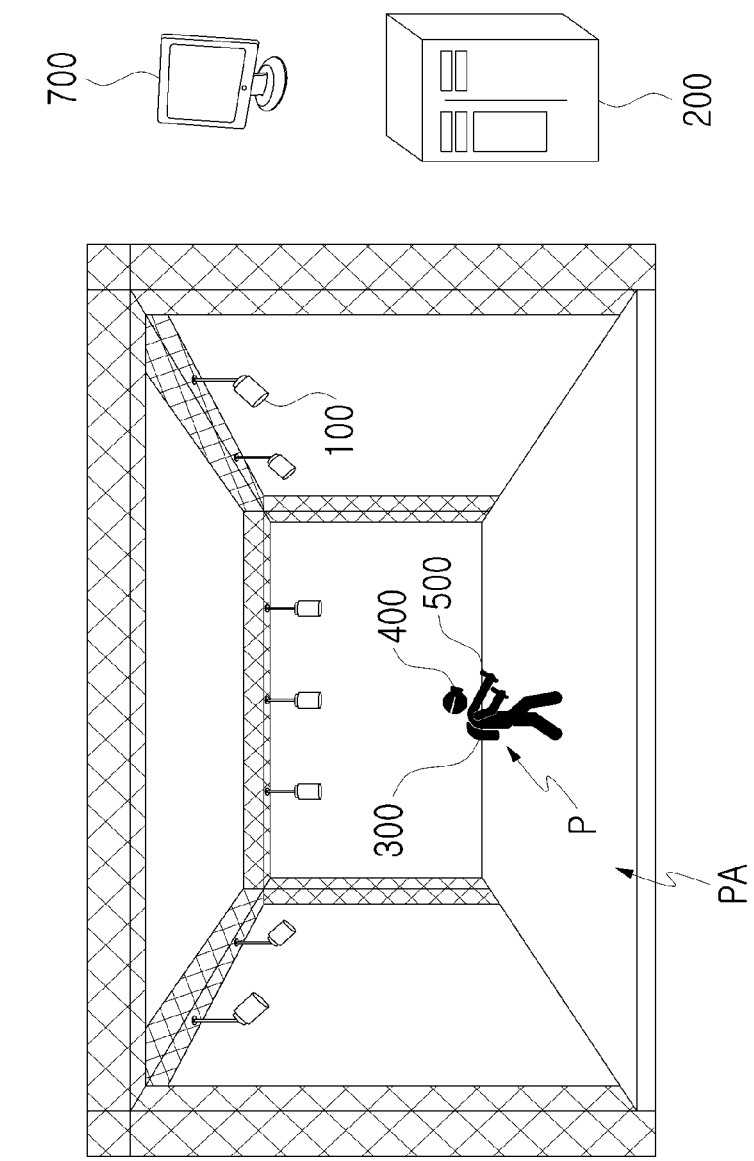
FIG. 6 is a diagram illustrating an implementation example of a system according to one embodiment.

FIG. 6 is a diagram illustrating an implementation example of a system according to one embodiment.

Referring to FIG. 6, the system for registration of divided spaces may be provided with a play space PA in which at least one player P plays.

In addition, the player P playing in the play space PA may be provided with an auxiliary computing device 300, a wearable display device 400, and an input device 500.

In addition, a target object to be provided to each player P may be provided with a marker M.

In one example, when target objects are the wearable display device 400 and the input device 500, the wearable display device 400 and the input device 500 may be provided with markers M in different patterns.

In addition, the play space PA may be provided with at least one detecting device 100.

In one example, as shown in FIG. 6, the play space PA may be provided with a plurality of detecting devices 100.

The detecting devices 100 may be provided to be spaced apart from each other at predetermined intervals around the periphery of the play space PA.

In addition, the detecting devices 100 may be provided to be spaced apart from each other at a predetermined height from the ground.

In addition, the detecting devices 100 may be provided to be oriented toward the play space PA.

The detecting devices 100 may be fixedly installed on a pre-installed frame.

In one example, as shown in FIG. 6, a frame for installing the detecting devices 100 may be provided around the play space PA. In addition, the detecting devices 100 may be fixedly installed on the frame.

The detecting devices 100 may acquire detecting data related to the play space PA.

A sensor 120 included in the detecting device 100 may acquire detecting data related to at least part of the play space PA.

In one example, the sensor 120 included in the detecting device 100 may acquire detecting data related to a sensing range of the sensor 120 in the play area PA.

The detecting device 100 may provide the detecting data to a server 200.

In one example, the detecting device 100 may provide the detecting data acquired by the sensor 120 to the server 200.

The server 200 may acquire current position data of the target object on the basis of the detecting data.

As shown in FIG. 6, when the plurality of detecting devices 100 are provided in the play space PA, the server 200 may acquire detecting data from the plurality of detecting devices 100 and acquire the current position data of target objects on the basis of the acquired detecting data.

In addition, the server 200 may acquire virtual position data VP of at least one target object on the basis of reality position data RP of the target objects.

In one example, the server 200 may acquire coordinates in virtual reality corresponding to coordinates included in the reality position data RP in the real world as virtual position data VP of a character C.

The server 200 may provide at least one of the reality position data RP and the virtual position data VP to the auxiliary computing device 300.

The auxiliary computing device 300 may acquire the virtual position data VP on the basis of the reality position data RP.

In addition, the auxiliary computing device 300 may acquire a virtual image on the basis of the virtual position data VP.

For example, the auxiliary computing device 300 may acquire virtual position data, which is a position of the character C in the virtual environment, on the basis of the virtual position data VP. Alternatively, the auxiliary computing device 300 may acquire virtual position data, which is a position of a virtual camera in the virtual environment, on the basis of the virtual position data VP.

The auxiliary computing device 300 may acquire a virtual image area on the basis of the virtual position data and virtual orientation direction which are included in the virtual position data.

The auxiliary computing device 300 may acquire a virtual image related to the virtual image area.

The auxiliary computing device 300 may acquire a virtual image related to a virtual image area in the virtual environment.

The auxiliary computing device 300 may provide the virtual image to the wearable display device 400.

The wearable display device 400 may output the virtual image to a user.

In addition, the server 300 may provide the virtual image to a viewing display device 700.

The server 300 may provide the virtual image acquired from the auxiliary computing device 300 to the connected viewing display device 700.

In addition, when the server 300 is connected to a plurality of auxiliary computing devices 300, the server 300 may acquire a virtual image from at least one auxiliary computing device 300 among the plurality of auxiliary computing devices 300 and provide the acquired virtual image to the connected viewing display device 700.

In one example, the server 300 may obtain selection of auxiliary computing devices 300 from which the virtual image is to be acquired from among the auxiliary computing devices 300 connected to the server 300 through the server inputter 230 and may provide the virtual image acquired from the selected auxiliary computing device 300 to the viewing display device 700.

In addition, the server 300 may acquire the virtual position data from the auxiliary computing device 300 and acquire a virtual image on the basis of the acquired virtual position data and a pre-set position of a virtual camera. In addition, the server 300 may provide the acquired virtual image to the connected viewing display device 700.

The viewing display device 700 may output the virtual image acquired from the server 300.

In addition, the input device 500 may be connected to at least one of the server 200, the auxiliary computing device 300, and the wearable display device 400.

In addition, the input device 500 may be provided with at least one marker M.

The input device 500 may be provided such that each player P carries the input device 500.

In one example, player P1 may carry the input device 400 in his/her hand.

According to one embodiment, the server device 400 may acquire reality position data of the input device 400 on the basis of the detecting data acquired from the detecting device 100. In addition, the reality position data of the input device 400 may include at least one of position data or orientation direction data of the input device 500 in the play space PA.

The auxiliary computing device 300 may determine an orientation direction of a virtual object corresponding to the input device in the virtual environment on the basis of the reality position data of the input device 400.

In addition, the auxiliary computing device 300 may acquire a virtual image in which the orientation direction of the virtual object corresponding to the input device in the virtual environment is taken into consideration.

In one example, the auxiliary computing device 300 may acquire a virtual image in which a gun corresponding to the input device is oriented in a direction corresponding to an orientation direction of the input device in the virtual environment.

In addition, the auxiliary computing device 300 may acquire a virtual image in which the generation of an event in accordance with an event generation command of the player through the input device 500 in the virtual environment is taken into consideration.

In one example, the auxiliary computing device 300 may acquire a virtual image showing that a character C corresponding to the player P fires a gun in the virtual environment when the player P1 presses a switch provided on the input device 500.

Figure 7:
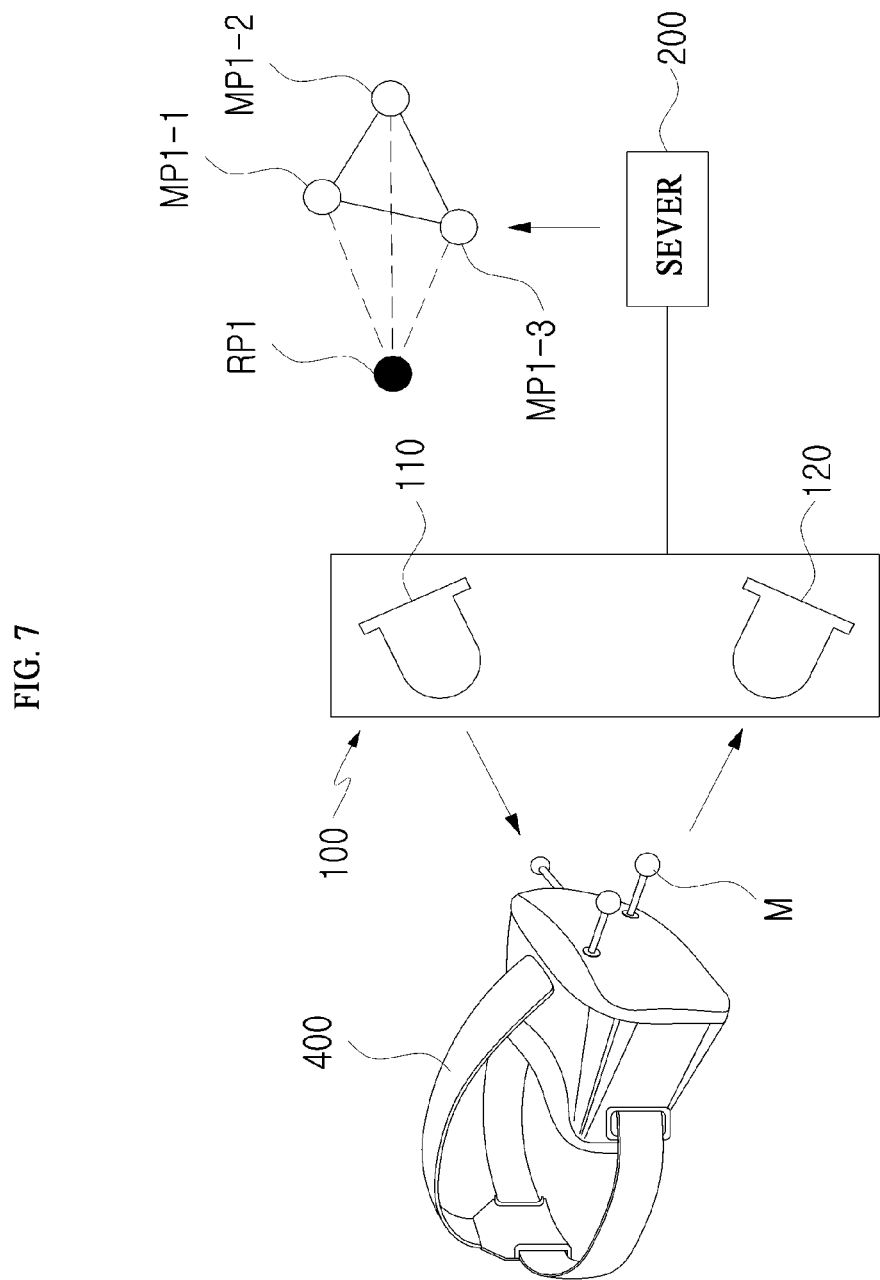
FIG. 7 is a schematic diagram illustrating a method of tracking a target object according to one embodiment.

FIG. 7 is a schematic diagram illustrating a method of tracking a target object according to one embodiment.

Referring to FIG. 7, the method of tracking a target object may acquire data related to the target object using an externally provided sensor and determine a position of the target object on the basis of the acquired data related to the target object.

Hereinafter, an example in which the target object is a wearable display device 400 will be described with reference to FIG. 7.

Referring to FIG. 7, the target object may be provided with a marker M for identifying the target object.

The marker M may be provided on the target object and serve as a reference for identifying and tracking the target object.

In order to track a target object, it is necessary to distinguish between the target object and the other devices, and it may be possible to identify the target object by providing a marker M to the target object.

In addition, when a plurality of target objects are provided, it is necessary to identify each of the target objects, and to this end, a marker provided on one object may be distinguishable from another marker M provided on another object.

For example, a marker M provided on one target object may be provided in a pattern different from that of another marker M provided on another target object.

In addition, the pattern may include various types of patterns such as a pattern formed by a plurality of marker M provided at different positions, an optical pattern provided on one display panel, and the like.

In addition, the marker M may be provided as a passive marker, which reflects or absorbs an optical signal projected from the light emitter 110, and an active marker which autonomously emits an optical signal.

For example, the passive marker may include a three-dimensional model with a light reflective material attached thereto, paper on which a recognizable code is printed, reflective tape, and the like.

In addition, the active marker may include an LED module, a radio wave generator, and the like.

According to one embodiment, the target object may be provided with at least one marker M.

In one example, when the system tracks a position of only one object, only one marker M may be provided on the target object. In addition, even when the system tracks a position of only one object, the target object may be provided with a plurality of markers M.

In addition, when the system tracks positions of a plurality of target objects, one target object may be provided with a plurality of markers M forming a pattern in order to identify each of the plurality of objects.

For example, when target objects whose positions are tracked by the system are a wearable display device 400 and an input device 500, the wearable display device 400 may be provided with a marker M in a first pattern. In addition, the input device 500 may be provided with a marker M in a second pattern.

The first pattern is different from the second pattern. When the first pattern which is detected during the position tracking, a device may be identified as the wearable display device 400, and when the second pattern is detected, the device may be identified as the input device 500.

In the above description, when a plurality of target objects are provided, the markers M provided on each of the plurality of target objects are provided to form a pattern in order to identify each of the plurality of target objects. However, the embodiment is not limited thereto, and even when a single target object is provided, markers M provided on the target object may be formed to form a pattern.

In addition, the pattern of the markers M provided on the target object may be used to identify a user.

In one example, the first pattern may be identified as the wearable display device 400 of a first user and the second pattern may be identified as the input device 500 of the first user. In addition, a third pattern may be identified as a wearable display device 400 of a second user and a fourth pattern may be identified as an input device 500 of the second user.

To track the target object, a server device 200 may acquire data related to the target object from the detecting system 100 and acquire detecting data related to a position of the target object on the basis of the acquired data. In addition, the server device 200 may track the position of the target object on the basis of the detecting data.

A description of a technique by which the detecting system 100 provides data related to a target object to the server device 200 will be given. The light emitter 110 of the detecting system 100 may project a signal to at least part of the play space PA.

In one example, when the light emitter 110 is an infrared LED, the light emitter 110 may project an infrared signal to at least part of the play space PA.

In addition, a sensor 120 may provide data acquired from an external source to the server device 200.

In one example, when the sensor 120 is a camera, the sensor 120 may provide an image signal acquired from an external source to the server device 200.

Although FIG. 7 illustrates only one sensor 120, the embodiment is not limited thereto. As described in FIG. 6, a plurality of sensors 120 may be provided and each of the plurality of sensors 120 may provide acquired data to the server device 200.

The server device 200 may determine the position of the target object on the basis of the data acquired from the sensor 120.

The server device 200 may determine whether the data acquired from the sensor 120 includes data related to a marker M. In addition, when it is determined that the data related to the marker M is included in the data acquired from the sensor 120, the server device 200 may identify the target object on the basis of a pattern of the marker M.

For example, when the data acquired from the sensor 120 includes a first pattern, the server device 200 may identify the target object as the wearable display device 400.

A plurality of patterns may exist in the data acquired from one sensor 120, and the server device 200 may identify the plurality of patterns.

The patterns may be pre-stored in the server device 200, and when the pre-stored pattern exists in the acquired data, the server device 200 may determine that the corresponding pattern is present and may identify a target object corresponding to the pattern.

The server device 200 may determine the position of the target object on the basis of the data acquired from the sensor 120.

A representative point RP related to each of the pre-stored patterns may be set in the server device 200. The representative point RP may be a point that represents a pattern.

When a pattern is provided through a plurality of markers M, coordinate data related to the plurality of markers M included in the pattern may be acquired and the server device 200 may acquire a representative point RP representing the pattern as the position of the target object that corresponds to the pattern.

Therefore, the server device 200 may acquire the data related to the position of the target object and track the target object.

The method of tracking a position of a target object is not limited to the above examples, and various types of methods of tracking a position may be used according to selection.

According to one embodiment, when the sensor 120 is provided as an image sensor, the sensor 120 may acquire an image of an outside and acquire position data related to the target object on the basis of the acquired image.

In one example, when the sensor 120 shown in FIG. 7 is provided on the wearable display device 400, the sensor 120 may be provided on one side of the wearable display device 400 and be oriented in an outward direction from the inside of the wearable display device 400 to acquire image data related to the outside of the wearable display device 400.

In addition, the wearable display device 400 may provide the acquired image data to the auxiliary computing device 300.

According to one embodiment, the wearable display device 400 may provide the image data to the auxiliary computing device 300 at a predetermined interval.

In one example, the wearable display device 400 may provide the image data to the auxiliary computing device 300 at the same interval as an interval at which the image data is acquired through the sensor 120.

The auxiliary computing device 300 may acquire at least one characteristic point from the acquired image data.

According to one embodiment, the auxiliary computing device 300 may acquire an object included in the image data as the characteristic point.

According to one embodiment, the auxiliary computing device 300 may acquire an object greater than a predetermined size from among objects included in the image data as the characteristic point.

The auxiliary computing device 300 may identify the objects included in the image data and acquire an object greater than a predetermined size from among the identified objects as the characteristic point. In addition, the auxiliary computing device 300 may determine a size of the object on the basis of the number of pixels occupied by the object included in the image data.

According to one embodiment, the auxiliary computing device 300 may acquire a pre-set type of object from among the objects included in the image data as the characteristic point.

For example, when a ball type object is pre-set, the auxiliary computing device 300 may acquire a ball type object, such as a baseball ball, a soccer ball, a basketball ball, or the like, which is included in the image data, as the characteristic point.

According to one embodiment, the auxiliary computing device 300 may acquire a marker included in the image data as the characteristic point.

The auxiliary computing device 300 may identify a marker, such as a barcode, a quick response (QR) code, or the like, which is included in the image data, and acquire the marker as the characteristic point.

In addition, the auxiliary computing device 300 may determine a position of the characteristic point included in the image data.

The auxiliary computing device 300 may determine at least one of a position change and a size change of the characteristic point on the basis of the image data acquired from the wearable display device 400.

The auxiliary computing device 300 may determine a moving direction and a moving distance of the wearable display device 400 on the basis of a position change direction, a position variation, and a size variation of the characteristic point.

In one example, the auxiliary computing device 300 may determine a position change of the characteristic point on the basis of image data acquired from the wearable display device 400.

The auxiliary computing device 300 may determine a moving direction and a moving distance of the wearable display device 400 on the basis of a position change direction and a position variation.

The auxiliary computing device 300 may determine a moving direction and a moving distance of the wearable display device 400 on the basis of a position change direction, a position variation, and a size variation of the characteristic point.

In one example, the auxiliary computing device 300 may compare a position of a characteristic point included in first image data acquired at a first point in time with a position of a characteristic point included in second image data acquired at a second point in time that is later than the first point in time and, when the comparison shows that the characteristic point in the first image data is moved to the right in the second image data, may determine that the wearable display device 400 is moved to the left.

In addition, the auxiliary computing device 300 may determine a moving distance of the characteristic point when the position of the characteristic point is changed.

The auxiliary computing device 300 may determine a moving distance of the characteristic point on the basis of the number of pixels between the position of the characteristic point in the first image data and the position of the characteristic point in the second image data.

Alternatively, the auxiliary computing device 300 may determine a moving distance of the characteristic point on the basis of coordinates of the characteristic point in the first image data and coordinates of the characteristic point in the second image data.

Also, for example, the auxiliary computing device 300 may determine a moving direction and a moving distance of the wearable display device on the basis of the size variation.

The auxiliary computing device 300 may compare a size of a characteristic point included in the first image data acquired at the first point in time with a size of a characteristic point included in the second image data acquired at the second point in time that is later than the first point in time, and when the comparison shows that the position of the characteristic point in the first image data is moved to the right in the second image data, may determine that the wearable display device 400 is moved to the left.

Accordingly, the auxiliary computing device 300 may track the position of the target object on the basis of a change in position of the target object relative to a pre-set initial position.

Figure 8:
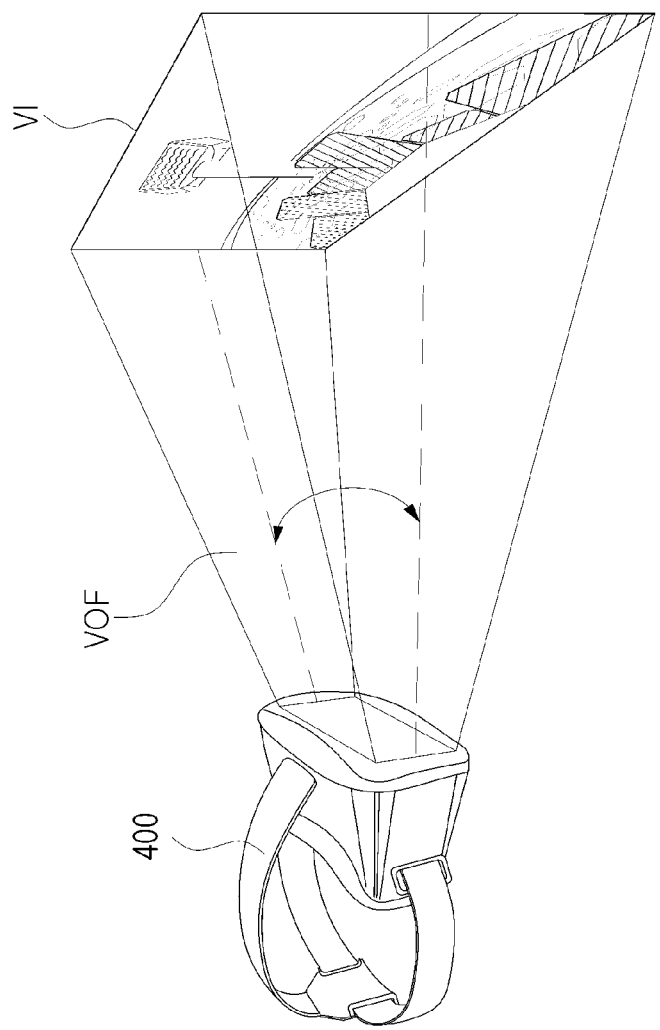
FIG. 8 is a diagram illustrating an implementation example of a virtual environment according to one embodiment.

FIG. 8 is a diagram illustrating an implementation example of a virtual environment according to one embodiment.

Referring to FIG. 8, a system may provide a virtual image related to at least part of a virtual environment through a wearable display device 400.

The virtual environment may include the background, a terrain object, a virtual object, and a character.

In one example, the virtual environment may be provided with a character corresponding to a player.

In another example, the virtual environment may be provided with a virtual object, such as a gun, corresponding to a controller possessed by the player.

The terrain object may be provided at a preset position in the virtual environment.

In addition, the terrain object may include an accessible terrain object to which a character can move into and an inaccessible terrain object to which the character is not able to move into.

In one example, the accessible terrain object may be a terrain object to which a character corresponding to a player may move when the corresponding player moves to a position corresponding to the terrain object. In addition, the inaccessible terrain object may be a terrain object to which a character corresponding to a player does not move even when the corresponding player moves to a position of the terrain object.

In addition, the character may include a non-player character (NPC) and a player character provided by a pre-programmed program.

For the virtual environment, position data may include at least one of reality position data and virtual position data.

The reality position data may include at least one of position coordinates and orientation direction of a target object.

In one example, the reality position data may be position coordinates of the target object located in a play space PA.

A server 200 may pre-store a coordinate value related to the play space PA.

The server 200 may pre-store a coordinate system related to the play space PA. The coordinate system may be at least one of a plane coordinate system, an orthogonal coordinate system, a polar coordinate system, a spatial coordinate system, a cylindrical coordinate system, and a spherical coordinate system.

The server 200 may acquire a coordinate value of the target object in the play space PA on the basis of detecting data and the coordinate system related to the play space PA. In addition, the server 200 may acquire the acquired coordinate value of the target object in the play space PA as reality position data.

In one example, when the detecting data is an infrared image, the server 200 may acquire a coordinate value of the marker in the play space PA on the basis of a position of the marker corresponding to the target object in the infrared image and an installation position of the detecting device 100 that has provided the infrared image. In addition, the server 200 may determine a pattern of the marker on the basis of the coordinate value of the marker in the play space PA and identify a target object corresponding to the pattern of the marker. In addition, the server 200 may acquire a representative point of the target object on the basis of the pattern of the marker and the coordinate value of the marker in the play space PA and acquire a coordinate value of a representative point of the target object as reality position data of the target object.

The server 200 may provide the reality position data to the auxiliary computing device 300.

The auxiliary computing device 300 may pre-store a coordinate value related to a virtual environment VW.

The auxiliary computing device 300 may pre-store a coordinate system related to the virtual environment VW. The coordinate system may be at least one of a plane coordinate system, an orthogonal coordinate system, a polar coordinate system, a spatial coordinate system, a cylindrical coordinate system, and a spherical coordinate system.

The auxiliary computing device 300 may acquire a coordinate value of a target object in the virtual environment VW on the basis of the reality position data and the coordinate system related to the virtual environment VW.

In one example, the auxiliary computing device 300 may acquire a coordinate value in the virtual environment VW corresponding to a coordinate value included in the reality position data and acquire the acquired coordinate value in the virtual environment VW as virtual position data.

The auxiliary computing device 300 may acquire a virtual image to be output to the user on the basis of the virtual position data.

According to one embodiment, the auxiliary computing device 300 may acquire virtual position data of the wearable display device 400 as virtual position data of a virtual camera and acquire field-of-view data of the virtual camera on the basis of the virtual position data of the virtual camera and an orientation direction of the virtual camera.

The auxiliary computing device 300 may acquire the orientation direction of the virtual camera on the basis of an orientation direction included in the reality position data of the wearable display device 400.

In addition, the auxiliary computing device 300 may acquire a predetermined area in the orientation direction of the virtual camera as a field of view of the virtual camera.

In addition, the auxiliary computing device 300 may acquire a virtual image corresponding to the field of view of the virtual camera in the virtual environment.

The auxiliary computing device 300 may provide the virtual image to the wearable display device 400.

The wearable display device 400 may output the acquired virtual image to the user through the wearable display screen outputter 450.

Hereinafter, a method of matching rotational delays according to one embodiment will be described.

Figure 9:
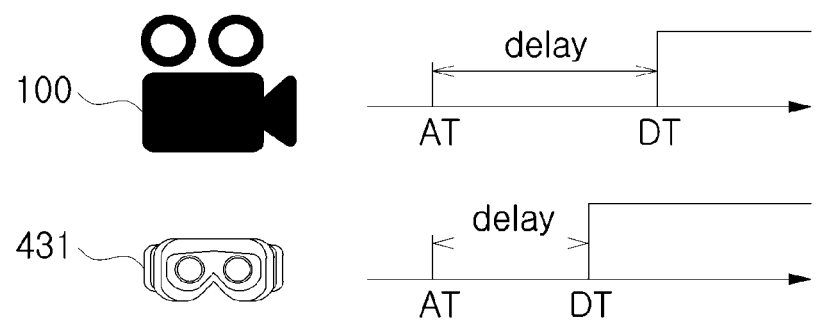
FIG. 9 is a diagram illustrating an example of rotational delay according to one embodiment.

FIG. 9 is a diagram illustrating an example of rotational delay according to one embodiment.

Referring to FIG. 9, an image provided through a display 400 of a wearable display device 400 in a system 10 may be part of virtual reality.

In one example, the image provided through the wearable display device 400 may be an image corresponding to a field of view in an orientation direction at a position of a virtual camera provided in the virtual reality.

In addition, the image provided through the display 400 of the wearable display device 400 may be provided differently depending on a rotational state of the wearable display device 400.

When the wearable display device 400 rotates left and right, and up and down, the orientation direction of the wearable display device 400 may be changed, and accordingly, an orientation direction of the virtual camera may be changed. In addition, as the orientation direction of the virtual camera is changed, the field of view of the virtual camera may be changed, and accordingly, the image to be provided through the wearable display device 400 may be changed.

In one example, the wearable display device 400 may be at a first position and oriented in a first direction in the real world, the virtual camera may be at the first position and oriented in the first direction in the virtual environment, and a first image corresponding to a field of view of the virtual camera at this time may be provided to the user through the wearable display device 400. In addition, when the wearable display device 400 at the first position may be oriented in a second direction that differs from the first direction, the virtual camera at the first position may be oriented in the second direction in the virtual environment, and a second image corresponding to a field of view of the virtual camera at this time may be provided to the user through the wearable display device 400.

Data related to the position and orientation direction of the wearable display device 400 may be acquired in various ways.

According to one embodiment, the data related to the position and orientation direction of the wearable display device 400 may be acquired on the basis of detecting data acquired by a detecting system 1000 and data acquired from a wearable display operation sensor module 431 of the wearable display device 400.

When the data related to the position and orientation direction of the wearable display device 400 is acquired on the basis of the detecting system 1000 and the wearable display operation sensor module 431, a time delay required for an auxiliary computing device 300 to provide the detecting data from the detecting system 100 and a time delay required for the auxiliary computing device 300 to acquire data from the wearable display operation sensor module 431 may differ from each other.

Thus, a point in time at which detecting data for one point in time is acquired and a time at which the data is acquired from the wearable display operation sensor module 431 may be different from each other, and accordingly, an error may occur.

In one example, rotation data acquired from the wearable display operation sensor module 431 at a point in time at which detecting data related to a first point in time is acquired may be rotation data acquired by the wearable display operation sensor module 431 regarding a point in time earlier than the first point in time.

When the position data is acquired on the basis of the rotation data acquired through the wearable display operation sensor module 431, inaccurate position data may be acquired due to an accumulated error. The detecting data acquired from a detecting device may have a relatively small error compared to the rotational data acquired through the wearable display operation sensor module 431.

Figure 10:
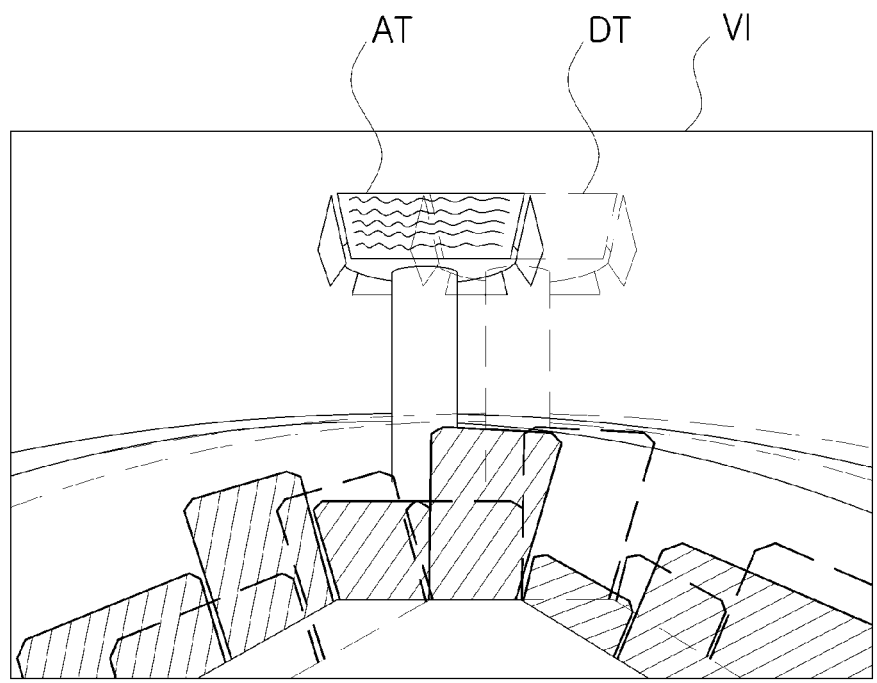
FIG. 10 is a diagram illustrating a rotational delay error according to one embodiment.

FIG. 10 is a diagram illustrating a rotational delay error according to one embodiment.

Referring to FIG. 10, when a wearable display device 400 worn by a player P is rotated 30 degrees to the right, the rotation data acquired through the wearable display operation sensor module 431 may indicate that the wearable display device 400 is rotated 20 degrees to the right.

Therefore, when a server 200 acquires position data of the wearable display device 400 on the basis of rotation data acquired through the wearable display operation sensor module 431 and acquires a virtual image on the basis of the position data, an area of the virtual image VI in the virtual environment, which should be moved to an actual operation position, is only moved to an error position DT due to the error, and thus an error may occur in distance between an actual moving distance and the movement in the screen.

Thus, the player may recognize that the screen which should be moved in accordance with the rotation of the player him/herself has not sufficiently moved and, accordingly, may feel discomfort such as sickness, fatigue, or the like.

Therefore, there is a need for removing an error due to a delay by matching the detecting data acquired from the detecting device 100 and the rotation data acquired from the wearable display operation sensor module 431.

Figure 11:
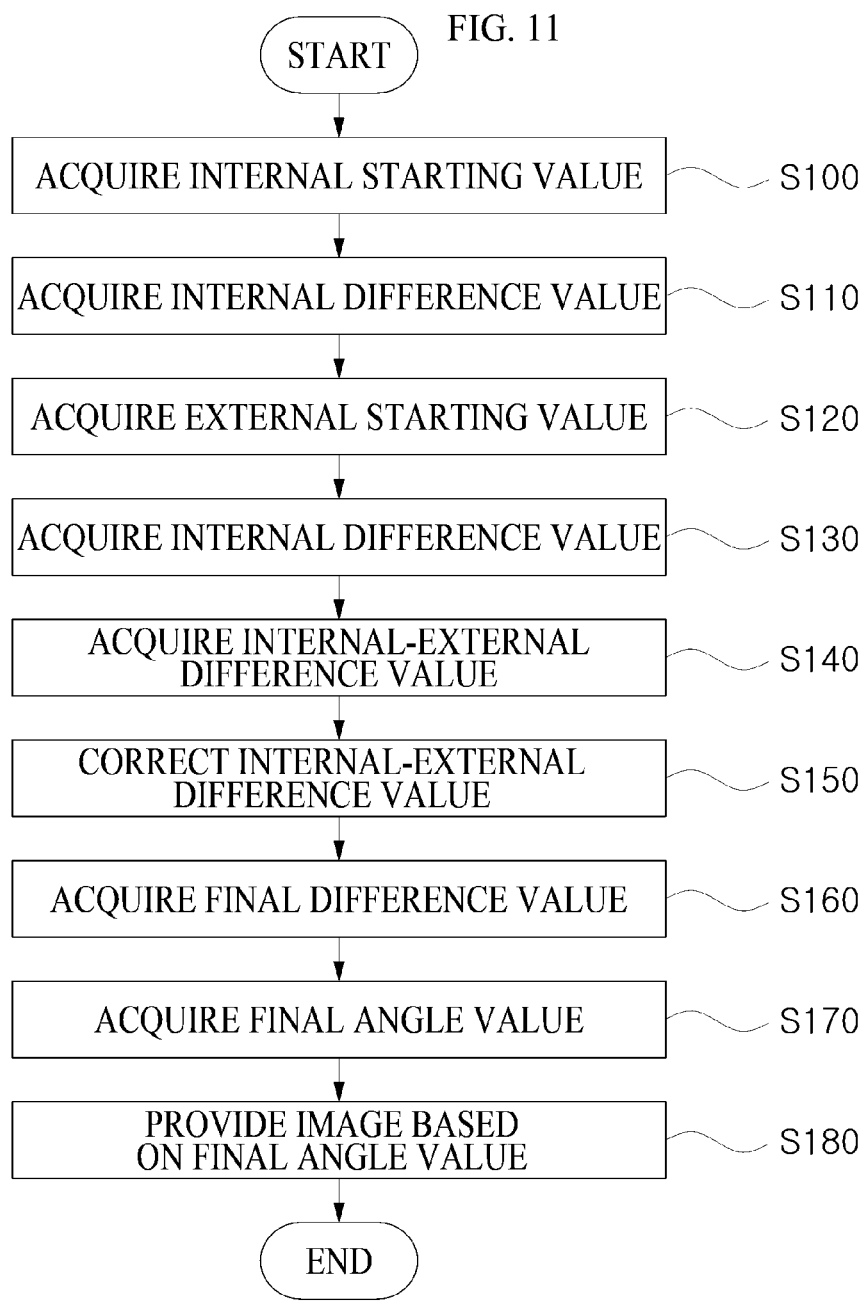
FIG. 11 is a flowchart illustrating a method of matching rotational delays according to one embodiment.

FIG. 11 is a flowchart illustrating a method of matching rotational delays according to one embodiment.

Referring to FIG. 11, the method of matching rotational delays may include setting first initial rotation data (S100), acquiring a first difference value (S110), setting second initial rotation data (S120), acquiring a second difference value (S130), acquiring a third difference value (S140), correcting the third difference value (S150), acquiring a fourth difference value (S160), acquiring a final angle value (S170), and providing an image on the basis of the final angle value (S180).

According to one embodiment, the acquiring of an internal starting value may be performed (S100).

An auxiliary computing device 300 may acquire rotation data of a wearable display device 400 from a wearable display operation sensor module 430 which acquires the rotation data of the wearable display device 400.

In addition, when the auxiliary computing device 300 acquires the rotation data for the first time, the auxiliary computing device 300 may set the acquired initial rotation data as the internal starting value.

According to one embodiment, acquisition of an internal difference value may be performed (S110).

The auxiliary computing device 300 may acquire rotation data of a wearable display device 400.

Here, a point in time at which the rotation data of the wearable display device 400 is acquired by the auxiliary computing device 300 may be later than a point in time at which the internal starting value is acquired in the preceding operation S100.

In addition, the auxiliary computing device 300 may acquire a first difference value on the basis of the internal starting value acquired in operation S100 and rotation value related to a point in time earlier than the point in time at which the internal starting value is acquired.

In one example, the auxiliary computing device 300 may acquire a difference between the internal starting value acquired at a first point in time and an rotation value acquired at a second point in time that is later than the first point in time as the internal difference value.

The auxiliary computing device 300 may convert the internal difference value into an angle value.

According to one embodiment, acquisition of the external starting value may be performed (S120).

The auxiliary computing device 300 may acquire detecting data related to the wearable display device 400 from the detecting device 100.

In addition, when the auxiliary computing device 300 acquires the rotation data for the first time, the auxiliary computing device 300 may set the acquired initial rotation data as an external starting value.

According to one example, acquisition of the second difference value may be performed (S130).

The auxiliary computing device 300 may acquire detecting data related to the wearable display device 400 from a detecting system 1000.

Here, a point in time at which the auxiliary computing device 300 acquires the detecting data related to the wearable display device 400 may be later than a point in time at which the external starting value is acquired in operation S120.

In addition, the auxiliary computing device 300 may acquire the external difference value on the basis of the external starting value acquired in the preceding operation S120 and detecting data related to the wearable display device 400 at a point in time later than the point in time at which the external starting value is acquired.

In one example, the auxiliary computing device 300 may acquire a difference between an external starting value acquired at a first point in time and detecting data acquired at a second point in time that is later than the first point in time as the external difference value.

According to one embodiment, acquisition of an internal-external difference value may be performed (S140).

The auxiliary computing device 300 may acquire the internal-external difference value that is a difference between the internal starting value and the external difference value.

According to one embodiment, correction of the internal-external difference value may be performed (S150).

The auxiliary computing device 300 may correct the internal-external difference value using a filter.

In one example, the auxiliary computing device 300 may correct the internal-external difference value using a Kalman filter.

According to one embodiment, acquisition of a final difference value may be performed (S160).

The auxiliary computing device 300 may acquire the final difference value that is a difference between the external starting value and the external difference value.

According to one embodiment, acquisition of a final angle value may be performed (S170).

The auxiliary computing device 300 may acquire the final angle value by multiplying the internal starting value converted into the angle value and a fourth difference value.

Figure 12:
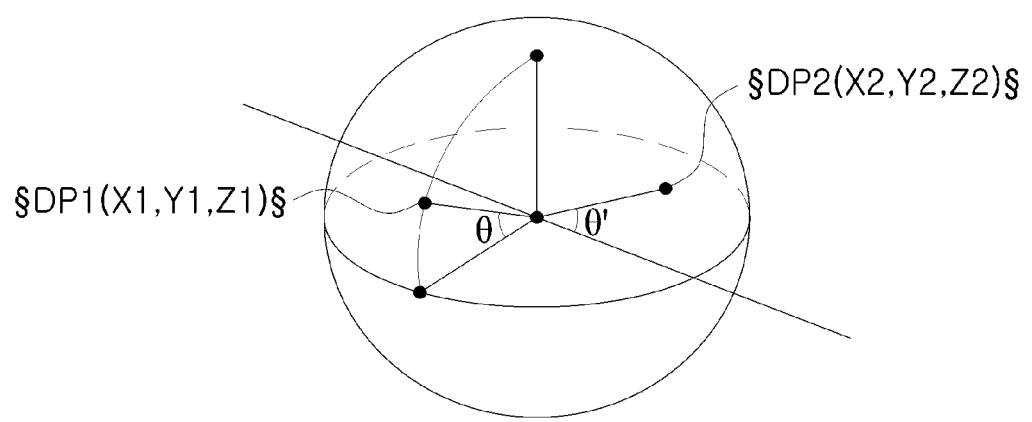
FIG. 12 is a diagram illustrating an example of the acquisition of a final angle value according to one embodiment.

FIG. 12 is a diagram illustrating an example of the acquisition of a final angle value according to one embodiment.

Referring to FIG. 12, as described in operation S110, the auxiliary computing device 300 may convert the internal difference value into an angle value.

The angle value according to one embodiment may be a quaternion.

As shown in FIG. 12, a quaternion may include an X-axis value, a Y-axis value, a Z-axis value, and an angle value (W, θ).

For example, the auxiliary computing device 300 may acquire an internal starting value DPI (X1, Y1, Z1, θ) converted into an angle value and acquire DP2 (X2, Y2, Z2, θ') which is a fourth difference value.

In addition, the auxiliary computing device may acquire a final angle value by multiplying the internal starting value DPI (X1, Y1, Z1, θ) and the fourth difference value DP2 (X2, Y2, Z2, θ').

Referring back to FIG. 11, according to one embodiment, provision of an image on the basis of the final angle value may be performed (S180).

The auxiliary computing device 300 may acquire a virtual field of view corresponding to the final angle value.

In addition, the auxiliary computing device 300 may acquire an image corresponding to the acquired virtual field of view.

In addition, the auxiliary computing device 300 may provide the acquired image to the wearable display device 400.

Figure 13:
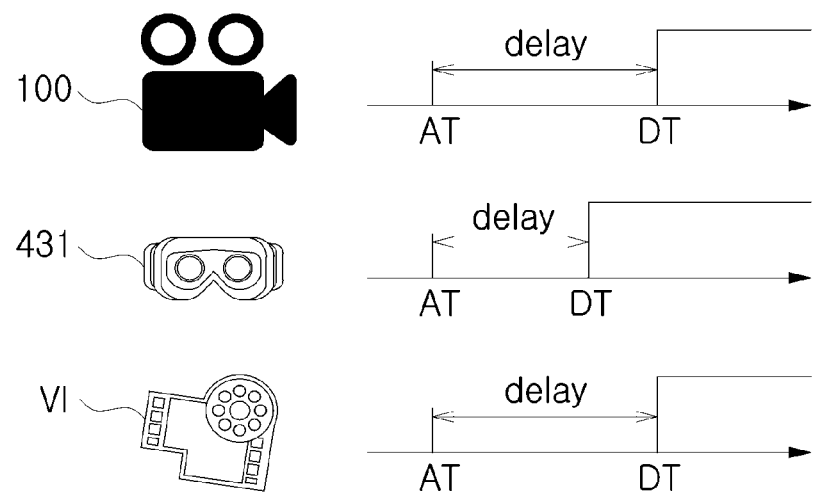
FIG. 13 is a diagram illustrating acquisition of a virtual image by matching rotational delays of a detecting device and a wearable display operation sensor module according to one embodiment.

FIG. 13 is a diagram illustrating acquisition of a virtual image by matching rotational delays of a detecting device and a wearable display operation sensor module according to one embodiment.

Referring to FIG. 13, the detecting data acquired from the detecting device 100 when a rotation of the wearable display device 400 occurs due to the movement of a player and the rotation data acquired from the wearable display operation sensor module 431 may have different delays, as described with reference to FIG. 9, and thus even for the rotation at the same point in time, the detecting data and the rotation data may be obtained at different points in time.

Therefore, an auxiliary computing device 300 may match a rotational angle value in which an error has occurred due to rotation data to position data based on detecting data acquired at a second point in time by matching rotation data acquired at a first point in time and the detecting data acquired at the second point in time. Also, the auxiliary computing device 300 may acquire a virtual image on the basis of the position data acquired based on the detecting data.

FIG. 14 is a diagram illustrating correction of a virtual image according to the above-described method of matching rotational delays.

Referring to FIG. 14, a determination result of a position of the wearable display device 400 on the basis of the rotation data acquired from the wearable display operation sensor 431 may indicate that an object may be located at a first center position CP1 in an acquired virtual image.

In addition, a determination result of a position of the display device on the basis of the detecting data acquired from the detecting device may indicate that an object may be located at a second center position CP2 in the acquired virtual image.

The auxiliary computing device 300 may acquire an angle value of the rotation of the wearable display device 400 through the above-described method of matching rotation delays and may acquire the virtual image in which the object is located at the second center position CP2 on the basis of the acquired angle value.

Figure 15:
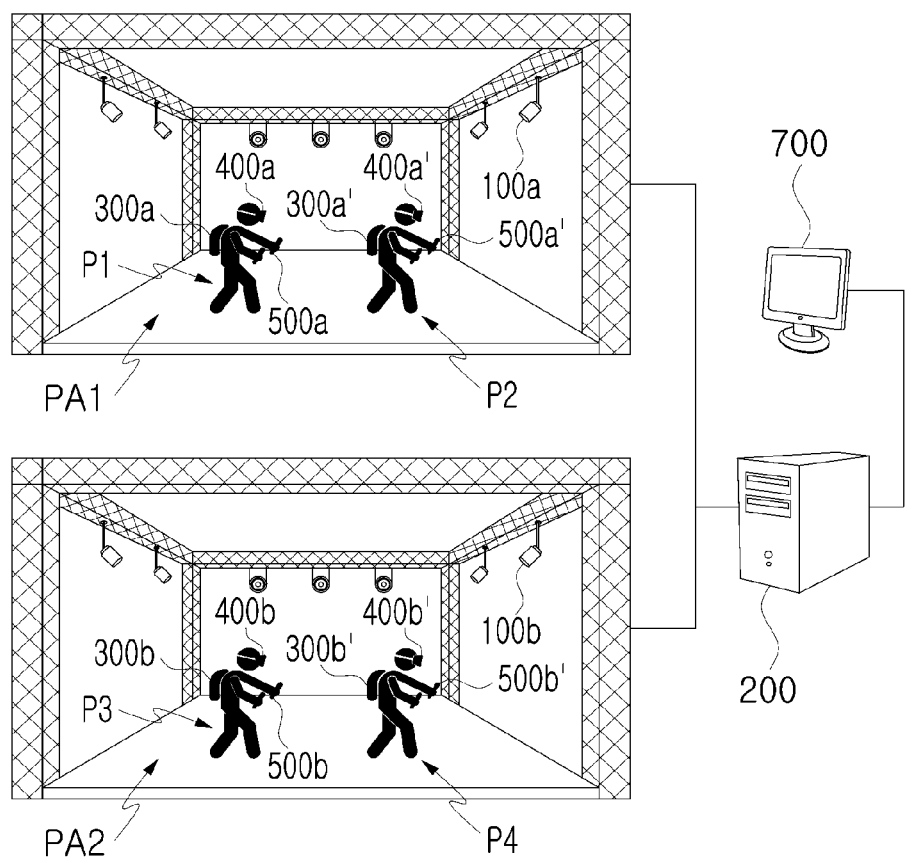
FIG. 15 is a diagram illustrating an example of a system for registration of divided spaces according to one embodiment.

FIG. 15 is a diagram illustrating an example of a system for registration of divided spaces according to one embodiment.

Referring to FIG. 15, the system for registration of divided spaces may be provided with a first play space PA1 and a second play space PA2.

The first play space PA1 may be a space in which a first player group plays in the real world.

In addition, the second play space PA2 may be a space in which a second player group plays in the real world.

The first play space PA1 and the second play space PA2 may have the same area but are not limited thereto, and the first play space PA1 and the second play space PA2 may have different areas from each other according to selection.

In addition, the first play space PA1 and the second play space PA2 may be provided separately from each other.

For example, the first play space PA1 and the second play space PA2 may be spaced apart from each other and provided independently.

In addition, a player P belonging to the first play group and a player P belonging to the second play group may be different from each other.

In one example, as shown in FIG. 15, a first player P1 and a second player P2 who belong to the first player group may play in the first play space PA1, and a third player P3 and a fourth player P4 who belong to the second player group may play in the second play space PA2.

The environment illustrated in FIG. 15 is merely an example for convenience of description, and the system for registration of divided spaces is not limited to FIG. 9 and may be provided in various forms according to selection.

In one example, FIG. 15 illustrates that the first play space PA1 and the second play space PA2 are provided, but the embodiment is not limited thereto, and more play spaces PA may be provided according to selection.

In addition, FIG. 15 illustrates that two players play in one play space PA, but the embodiment is not limited thereto, and more or fewer players may play in one play space PA.

A player P playing in the first play space PA1 and a player P playing in the second play space PA2 may be provided with an auxiliary computing device 300, a wearable display device 400, and an input device 500.

In one example, as shown in FIG. 15, the first player P1 may be provided with a (1-1)th auxiliary computing device 300a, a (1-1)th wearable display device 400a, and a (1-1)th input device 500a. In addition, as shown in FIG. 15, the second player P2 may be provided with a (1-2)th auxiliary computing device 300a', a (1-2)th wearable display device 400a', and a (1-2)th input device 500a'.

In addition, each of the third player P3 and the fourth player P4 who play in the second play space PA2 may be provided with an auxiliary computing device 300, a wearable display device 400, and an input device 500.

For example, as shown in FIG. 15, the third player P3 may be provided with a (2-1)th auxiliary computing device 300b, a (2-1)th wearable display device 400b, and a (2-1)th input device 500b. In addition, as shown in FIG. 15, the fourth player P4 may be provided with a (2-2)th auxiliary computing device 300b', a (2-2)th wearable display device 400b', and a (2-2)th input device 500b'.

In addition, a marker M may be provided on at least one of the auxiliary computing device 300, the wearable display device 400, and the input device 500, which are provided to each of the players P.

For example, a marker M may be provided on the wearable display device 400 provided to each of the players P.

At least one detecting device 100 may be provided in each of the first play space PA1 and the second play space PA2.

In one example, as shown in FIG. 15, the first detecting system 100a may be provided in the first play space PA1 and the second detecting device 100b may be provided in the second play space PA2. The first detecting device 100a may be a detecting device 100 provided in the first play space PA1 and the second detecting device 100b may be a detecting device 100 provided in the second play space PA2.

The first detecting device 100a provided in the first play space PA1 may acquire detecting data related to a target object located in the first play space PA1.

For example, the first detecting device 100a may acquire detecting data related to the marker provided on one of the (1-1)th auxiliary computing device 300a, the (1-1)th wearable display device 400a, and the (1-1)th input device 500a, which are provided to the first player P1 located in the first play space PA1, and the (1-2)th auxiliary computing device 300a', the (1-2)th wearable display device 400a', and the (1-2)th input device 500a', which are provided to the second player P2.

In addition, the second detecting device 100b provided in the second play space PA2 may acquire detecting data related to a target object located in the second play space PA2.

For example, the second detecting device 100b may acquire detecting data related to the marker provided on one of the (2-1)th auxiliary computing device 300b, the (2-1)th wearable display device 400b, and the (2-1)th input device 500b, which are provided to the third player P3 located in the second play space PA2, and the (2-2) auxiliary computing device 300b', the (2-2)th wearable display device 400b', and the (2-2)th input device 500b', which are provided to the fourth player P4.

In addition, a plurality of first detecting devices 100a and a plurality of second detecting devices 100b may be provided.

In one example, a plurality of first detecting devices 100a may be provided in the first play space PA1.

In addition, a plurality of second detecting devices 100b may be provided in the second play space PA2.

The same number of detecting devices 100b may be provided in the second play space PA as the number of first detecting devices 100a provided in the first play space PA1, but the embodiment is not limited thereto. A different number of detecting devices 100 may be provided in the first play space PA1 and the second play space PA2.

The first detecting device 100 may acquire first detecting data related to the first play space PA1.

For example, a sensor 120 included in the first detecting device 100a may acquire a detecting signal related to the first play space PA1.

The first detecting device 100a may provide a first detecting signal to a server 200.

For example, the first detecting device 100a may provide first detecting data related to the first play space PA1 acquired by the sensor 120 included in the first detecting device 100a to the server 200.

The server 200 may acquire reality position data of the target object in the first play space PA1 on the basis of the first detecting data.

As shown in FIG. 15, when a plurality of detecting devices 100 are provided in the first play space PA1, the server 200 may acquire first detecting signals from the plurality of detecting devices 100 and acquire the first detecting data on the basis of the acquired detecting signals.

The second detecting device 100b may be provided in the second play space PA2.

The second detecting device 100b may acquire second detecting data related to the second play space PA2.

For example, a sensor 120 included in the second detecting device 100b may acquire the second detecting data related to the second play space PA2.

The second detecting device 100b may provide the detecting data related to the second play space PA2 to the server 200.

The server 200 may identify the first detecting data and the second detecting data.

The server 200 may pre-store data related to a light emitter 110 and a sensor 120 included in the first detecting device 100a, the marker M, and a pattern of a marker M for each target object.

For example, the server 200 may pre-store identification data related to the sensor 120 included in the first detecting device 100a and a sensor 120 included in the second detecting device 100b in a server storage 220.

The server 200 may obtain detecting data acquired from the sensor 120 included in the first detecting device 100a as the first detecting data and obtain detecting data acquired from the sensor 120 included in the second detecting system 100a as the second detecting data.

For example, the server 200 may acquire a user's setting for determining the detecting device 100 installed in the first play space PA1 as the first detecting device 100a from among the detecting devices 100 connected to the server 200 through a server communicator 210 and acquire the first detecting data on the basis of the detecting signal acquired from the first detecting device 100a.

The server 200 may acquire reality position data RP of players playing in one of the first play space PA1 and the second play space PA2 in the real world on the basis of the first detecting data and the second detecting data.

For example, the server 200 may acquire reality position data of the first player P1 and the second player P2 in the first play space PA1 on the basis of the first detecting data. In addition, the server 200 may acquire position data of the third player P3 and the fourth player P4 in the second play space PA2 on the basis of the second detecting data.

In addition, the server may acquire virtual position data VP of a character C corresponding to the player on the basis of the reality position data RP of the players in the real world.

For example, the server 200 may acquire coordinates in the virtual reality corresponding to coordinates included in the reality position data RP of the players in the real world as the virtual position data VP of the character C.

The server 200 may provide at least one of the reality position data RP and the virtual position data VP to the auxiliary computing device 300.

The auxiliary computing device 300 may acquire virtual position data VP on the basis of the reality position data RP.

In addition, the auxiliary computing device 300 may acquire a virtual image on the basis of the virtual position data VP.

For example, the auxiliary computing device 300 may acquire the virtual position data that is a position of the character C in the virtual environment on the basis of the virtual position data VP. Alternatively, the auxiliary computing device 300 may acquire virtual position data that is a position of a virtual camera in the virtual environment on the basis of the virtual position data VP.

The auxiliary computing device 300 may acquire a virtual image area on the basis of the virtual position data and virtual orientation direction included in the virtual position data.

The auxiliary computing device 300 may acquire a virtual image related to the virtual image area.

The auxiliary computing device 300 may acquire a virtual image related to the virtual image area in the virtual environment.

The auxiliary computing device 300 may provide the virtual image to the wearable display device 400.

The wearable display device 400 may output the virtual image to the user.

In addition, the wearable display device 400 may provide the virtual image to a viewing display device 700.

Figure 16:
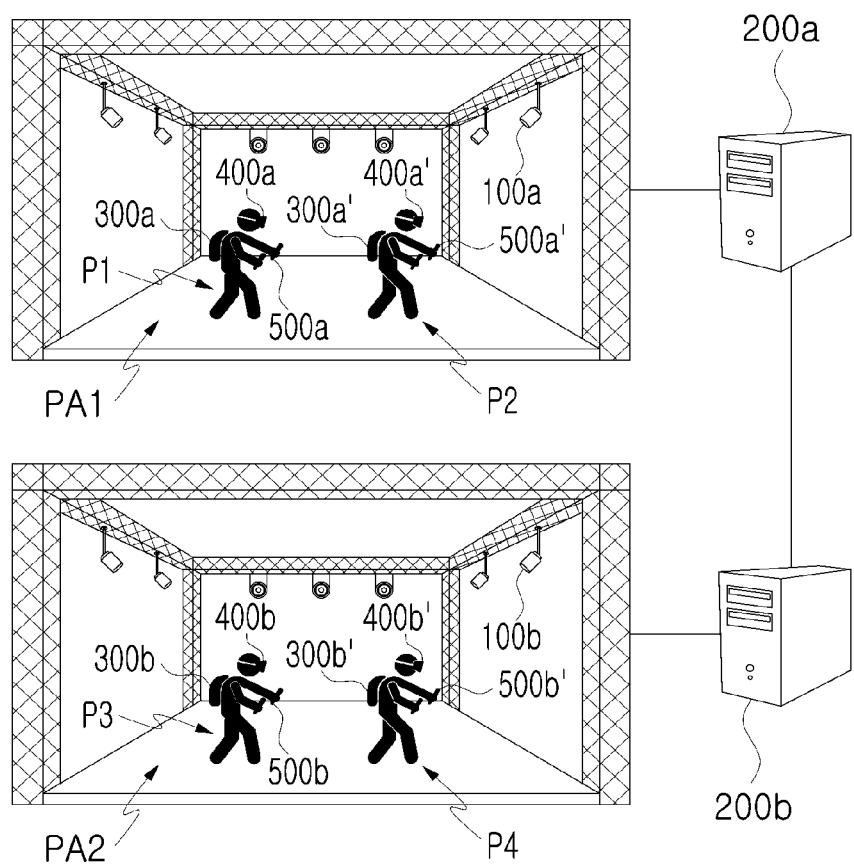
FIG. 16 is a diagram illustrating another system for registration of divided spaces according to one embodiment.

FIG. 16 is a diagram illustrating another system for registration of divided spaces according to one embodiment.

The system illustrated in FIG. 16 may be a system provided by connecting each of the detecting devices 100 in the system described with reference to FIG. 15 to a different server 200.

For example, the system may be used to provide a single virtual environment to players playing in play spaces PA located in different regions through a network between the servers 200.

Referring to FIG. 16, the system for registration of divided spaces may be provided with a first play space PAI and a second play space PA2.

In addition, a first player P1 and a second player P2, who belong to a first player group, may play in the first play space PAI and a third player P3 and a fourth player P4, who belong to a second player group, may play in the second play space PA2.

A player P playing in the first play space PA1 and a player P playing in the second play space PA2 may be provided with an auxiliary computing device 300, a wearable display device 400, and an input device 500.

For example, as shown in FIG. 16, the first player P1 may be provided with a (1-1)th auxiliary computing device 300*a*, a (1-1)th wearable display device 400*a*, and a (1-1)th input device 500*a*. In addition, as shown in FIG. 16, the second player P2 may be provided with a (1-2)th auxiliary computing device 300*a'*, a (1-2)th wearable display device 400*a'*, and a (1-2)th input device 500*a'*.

In addition, each of the third player P3 and the fourth player P4 who play in the second play space PA2 may be provided with an auxiliary computing device 300, a wearable display device 400, and an input device 500.

For example, as shown in FIG. 16, the third player P3 may be provided with a (2-1)th auxiliary computing device 300*b*, a (2-1)th wearable display device 400*b*, and a (2-1)th input device 500*b*. In addition, as shown in FIG. 16, the fourth player P4 may be provided with a (2-2)th auxiliary computing device 300*b'*, a (2-2)th wearable display device 400*b'*, and a (2-2)th input device 500*b'*.

In addition, a marker M may be provided on at least one of the auxiliary computing device 300, the wearable display device 400, and the input device 500, which are provided to each of the players P.

For example, a marker M may be provided on the wearable display device 400 provided to each of the players P.

A first detecting device 100*a* may be provided in the first play space PA1.

The first detecting device 100*a* may acquire first detecting data related to the first play space PA1.

The first detecting device 100*a* may provide the first detecting data to a first server 200*a*.

The second play space PA2 may be provided with the second detecting system 100*b*.

The second detecting system 100*b* may acquire the second detecting data related to the second play space PA2.

The second detecting system 100*b* may provide the second detecting data to the second server 200*b*.

The first server 200*a* may acquire detecting data related to the players belonging to the first player group playing in the first play space PA1 and the second server 200*b* may acquire detecting data related to the players belonging to the second player group playing in the second play space PA2.

The first server 200*a* may provide the detecting data, which is related to the players belonging to the first player group playing in the first play space PA1, to the second server 200*b*.

The second server 200*b* may provide the detecting data, which is related to the players belonging to the second player group playing in the second play space PA2, to the first server 200*a*.

The first server 200*a* may provide the detecting data related to the players of the first player group and the second player group to the auxiliary computing devices 300 worn by the players of the first player group.

The second server 200*b* may provide the detecting data related to the players of the first player group and the second player group to the auxiliary computing devices 300 worn by the players of the second player group.

The auxiliary computing devices 300 worn by the players belonging to the first player group and the second player group may provide images related to the virtual environment to the wearable display device 400 connected to the auxiliary computing devices 300 on the basis of the detecting data related to the players of the first player group and the second player group.

Figure 17:
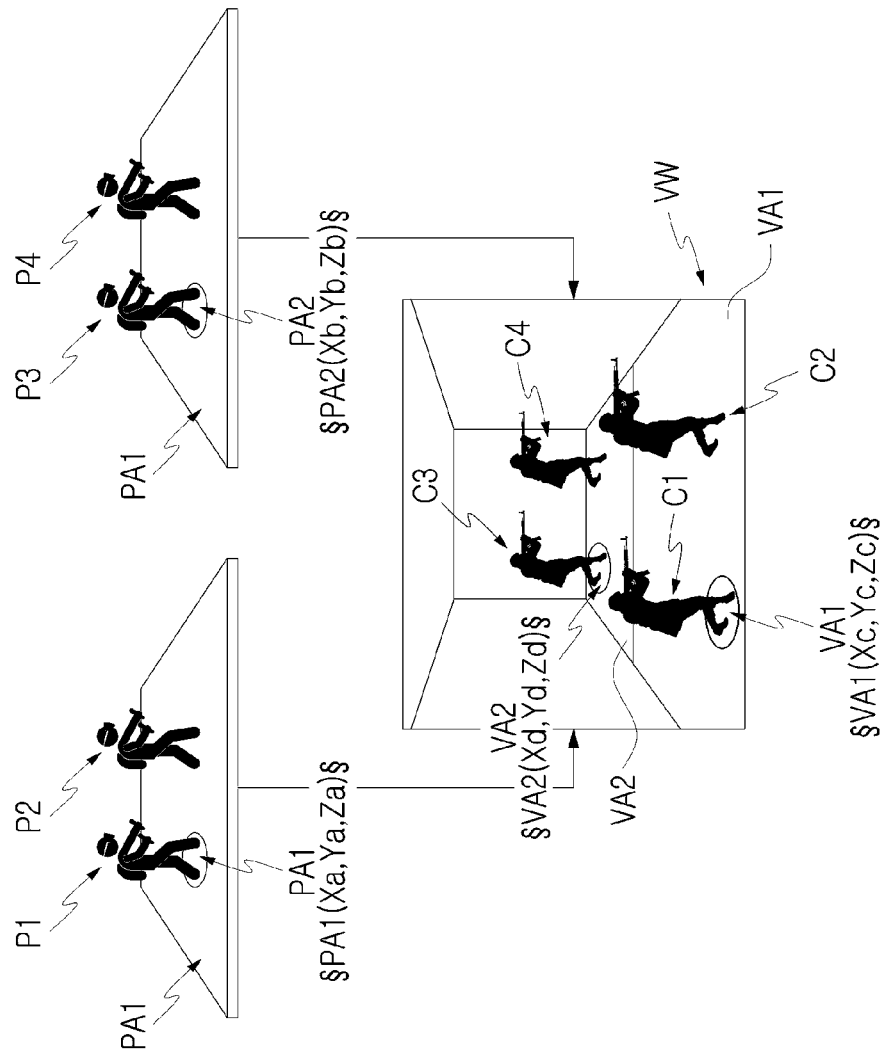
FIG. 17 is a diagram illustrating an example of registration of divided spaces according to one embodiment.

FIG. 17 is a diagram illustrating an example of registration of divided spaces according to one embodiment.

Referring to FIG. 17, a first play space PA1 and a second play space PA2 may be provided.

In addition, a first player group may play in the first play space PA1 and a second player group may play in the second play space PA2.

For example, a first player P1 and a second player P2 may play in the first play space PA1 and a third player P3 and a fourth player P4 may play in the second play space PA2.

In a virtual environment, characters may be provided corresponding to the first player P1 and the second player P2 who play in the first play space PA1 and the third player P3 and the fourth player P4 who play in the second play space PA2.

A first character C1 corresponding to the first player P1 in the virtual environment VW may be provided at a virtual position corresponding to a position of the first player P1 in the first play space PA1.

Referring to FIG. 17, when reality position data of the first player P1 playing in the first play space PA1 is PA1 (Xa, Ya, Za), the first character C1 corresponding to the first player P1 may be provided at a position (Xc, Yc, Zc) in the virtual environment VW.

In addition, when reality position data of the second player P2 playing in the second play space PA2 is (Xb, Yb, Zb), a second character C2 corresponding to the second player P2 may be provided at (Xd, Yd, Zd) in the virtual environment VW.

In addition, a virtual area in which the character corresponding to the player playing in the first play space PA1 is provided may be provided separately from a virtual area in which the character corresponding to the player playing in the second play space PA2 is provided.

Referring to FIG. 17, the reality position data of the first player P1 playing in the first play space PA1 is PA1 (Xa, Ya, Za), a first character C1 corresponding to the first player P1 may be provided at VA1 (Xc, Yc, Zc) in a first virtual area VA1.

In addition, the reality position data of the second player P2 playing in the second play space PA2 is PA2 (Xb, Yb, Zb), a second character C2 corresponding to the second player P2 may be provided at VA2 (Xd, Yd, Zd) in a second virtual area VA2.

The auxiliary computing device 300 may acquire a position of a virtual camera for each player on the basis of the position of the character in the virtual environment.

For example, the auxiliary computing device 300 may acquire a position of a virtual camera of the first player on the basis of the position of the first character.

In addition, the auxiliary computing device 300 may acquire a virtual image on the basis of the position of the virtual camera.

For example, the auxiliary computing device 300 may acquire a field of view to be provided to the first player on the basis of the position of the virtual camera of the first player and acquire an area corresponding to the field of view of the first player in the virtual environment as a virtual image to be provided to the first player.

Figure 18:
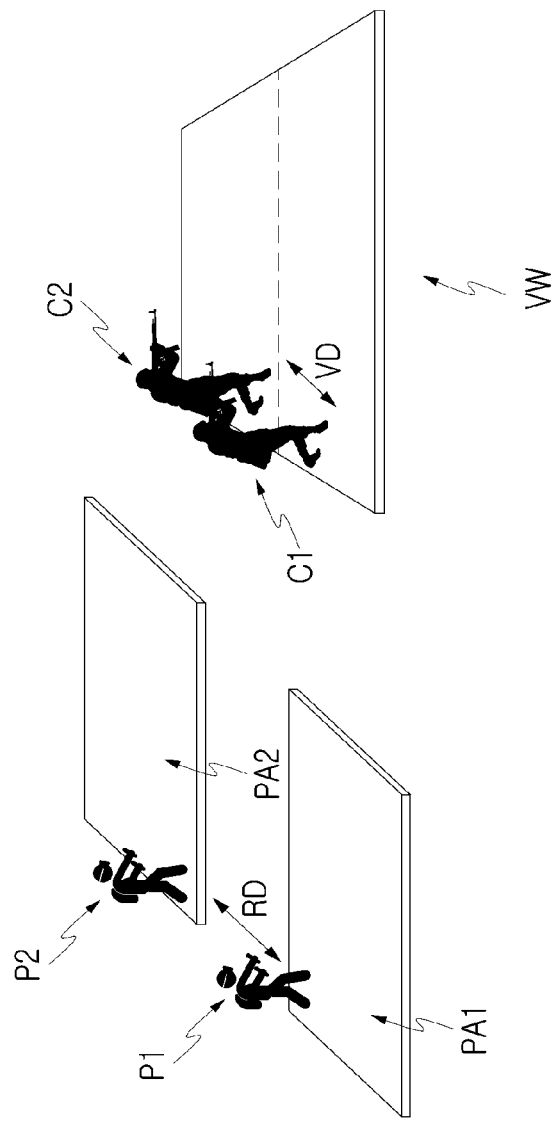
FIG. 18 is a diagram illustrating an example of a distance relationship in registration of divided spaces according to one embodiment.

FIG. 18 is a diagram illustrating an example of a distance relationship in registration of divided spaces according to one embodiment.

Referring to FIG. 18, a first play space PA1 and a second play space PA2 may be provided.

The first play space PA1 and the second play space PA2 may be spaced apart from each other and provided independently.

For example, as shown in FIG. 18, the first play space PA1 and the second play space PA2 may be spaced a predetermined distance from each other.

In addition, a first player P1 may play in the first play space PA1 and a second player P2 may play in the second play space PA2.

In addition, in a virtual environment VW, a first character C1 corresponding to the first player P1, and a second character C2 corresponding to the second player P2 may be provided.

A real distance between the first player P1 and the second player P2 in the real world may be different from a virtual distance VD between the first character C1 and the second character C2 in the virtual environment.

For example, when coordinates of the first player P1 in the real world is (1, 1, 1) and coordinates of the second player P2 in the real world is (1, 11, 1), that is, the second player P2 is spaced at a distance of 10 units from the first player P1 along a Y axis, coordinates of the first character C1 in the virtual environment may be provided as (1, 1, 1) and coordinates of the second character C2 may be provided as (1, 5, 1) such that the first character C1 and the second character C2 are spaced at a distance of 5 units along the Y axis in the virtual environment. Thus, the real distance RD between the first player P1 and the second player P2 may be provided differently from the virtual distance VD between the first character C1 and the second character C2 in the virtual environment.

Accordingly, a distance to the second character C2 as viewed by the first player in a virtual image output to the first player through the wearable display device 400 may be different from the distance between the first player P1 and the second player P2 in the real world.

For example, when the first player P1 and the second player P2 are spaced at a distance of 10 units along the Y axis in the real world, the second character C2 may be spaced at a distance of 5 units from the first character C1 along the Y axis in the virtual image provided through the wearable display device 400.

Figure 19:
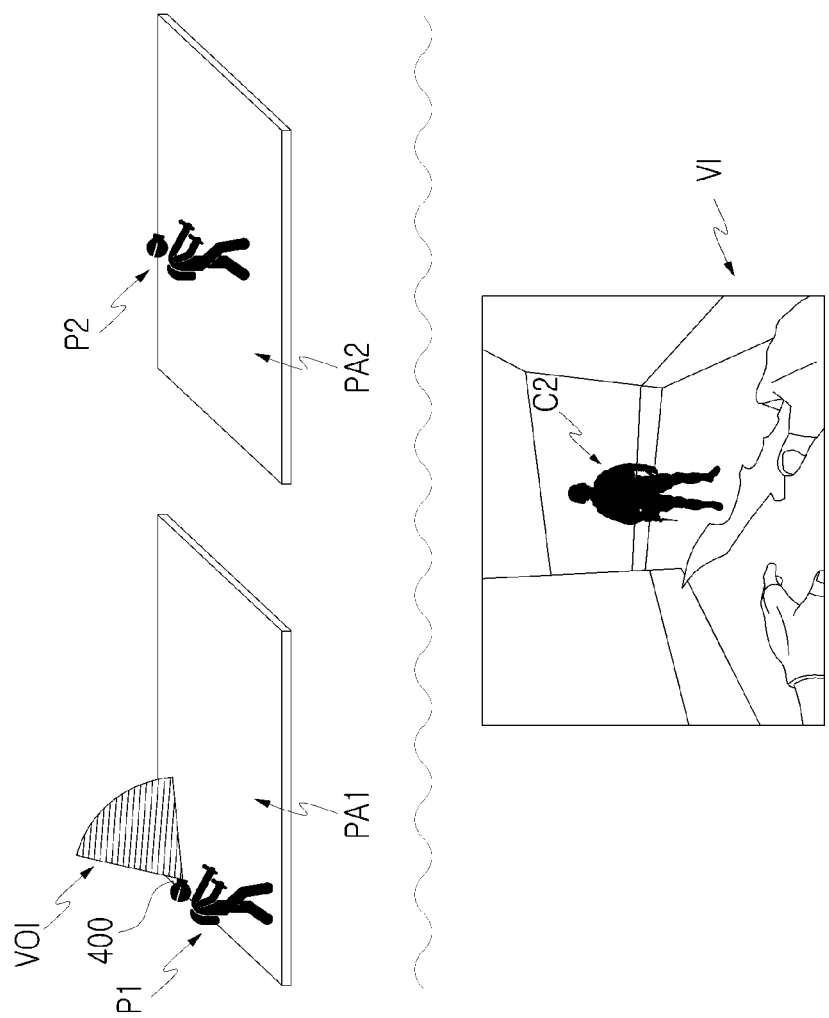
FIG. 19 is a diagram illustrating an example of matching fields of view in registration of divided spaces according to one embodiment.

FIG. 19 is a diagram illustrating an example of matching fields of view in registration of divided spaces according to one embodiment.

Referring to FIG. 19, a first play space PA1 and a second play space PA2 may be provided.

The first play space PA1 and the second play space PA2 may be spaced apart from each other and provided independently.

For example, as shown in FIG. 19, the first play space PA1 and the second play space PA2 may be spaced a predetermined distance from each other.

As shown in FIG. 19, even when the first play space PA1 and the second play space PA2 are spaced apart from each other in a first direction, they may be provided in a second direction.

For example, as shown in FIG. 19, even when the first play space PA1 and the second play space PA2 are spaced apart from each other in a first direction, the two play spaces PA may be provided in a virtual environment through registration in a horizontal direction, as shown as a virtual space VW in FIG. 19.

In addition, a first player P1 may play in the first play space PA1 and a second player P2 may play in the second play space PA2.

Even when the second player P2 is not positioned in a second direction perpendicular to a first direction when the first player P1 gazes in the second direction, a second character C2 may be provided in a field of view (VOF) of the virtual environment provided to the first player P1.

For example, in the case where the first player P1 orients a wearable display device 400 in the second direction perpendicular to the first direction, the second character C2 may be provided in a virtual image VI provided to the first player P1 through the wearable display device 400 even when the second player P2 is not located in the second direction in the real world.

Figure 20:
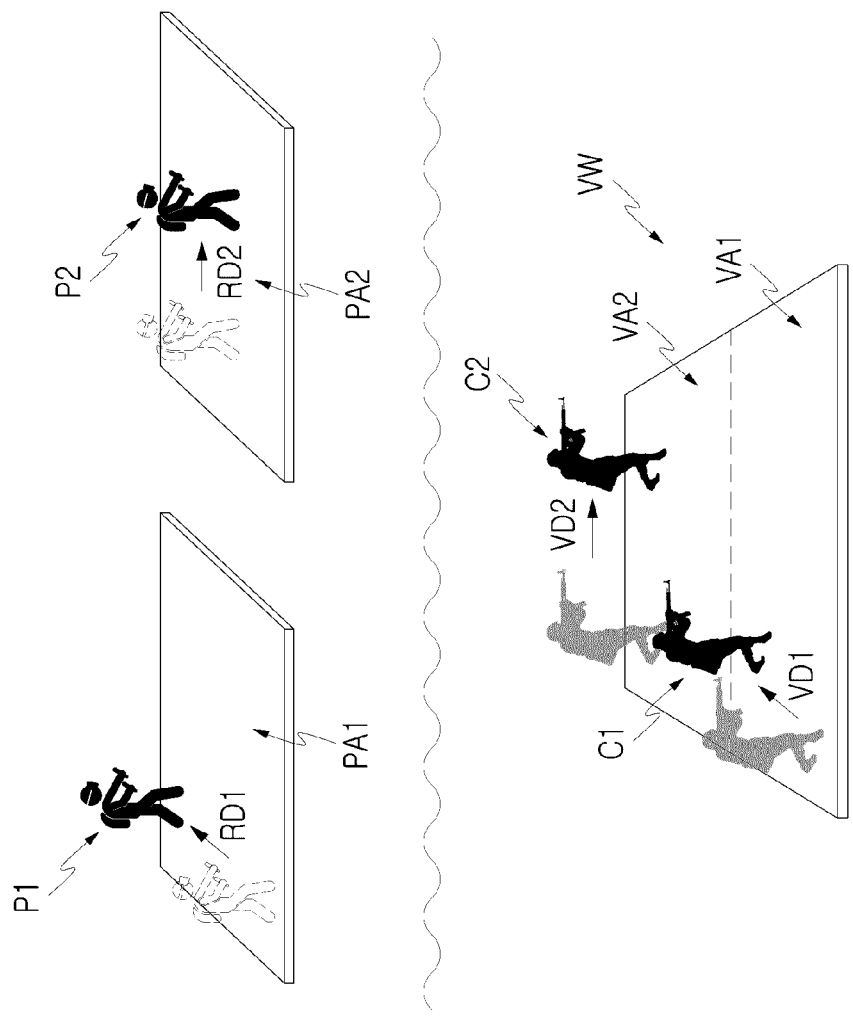
FIG. 20 is a diagram illustrating an example of movement in registration of divided spaces according to one embodiment.

FIG. 20 is a diagram illustrating an example of movement in registration of divided spaces according to one embodiment.

Referring to FIG. 20, a first play space PA1 and a second play space PA2 may be provided.

The first play space PA1 and the second play space PA2 may be spaced apart from each other and provided independently.

In addition, a first player P1 may play in the first play space PA1 and a second player P2 may play in the second play space PA2.

Also, a first virtual environment area VA1 corresponding to the first play space PA1 and a second virtual environment area VA2 corresponding to the second play space PA2 may be provided in a virtual environment V1.

The first virtual environment area VA1 and the second virtual environment area VA2 may be provided by dividing an arbitrary space in the entire virtual environment.

A first character C1 corresponding to the first player P1 playing in the first play space PA1 may move in the first virtual environment area VA1.

The first character C1 corresponding to the first player P1 playing in the first play space PA1 may be restricted from moving to the second virtual environment area VA2 in which the second character C1, which corresponds to the second player C2 playing in the second play space PA2, is provided.

The second character C2 corresponding to the second player P2 playing in the second play space PA2 may move in the second virtual environment area VA2.

The second character C2 corresponding to the second player P2 playing in the second play space PA2 may be restricted from moving to the first virtual environment area VA1 in which the first character C1, which corresponds to the first player P1 playing in the first play space PA1, is provided.

Even when the second player P2 located in the second play space PA2 spaced apart from the first player P1 in a first direction in the real world moves in the first direction, an image may be provided in which the second character C2 located in the second direction from the first character C1 in the virtual environment moves in the first direction.

For example, even when the second player P2 located in the second play space PA2 provided ahead of the first player P1 moves forward in the real world, the virtual image provided to the first player P1 through the wearable display device 400 may be provided in which the second character C2 located to the left side of the first character C1 moves forward.

In addition, when the first player moves in the second direction in a state in which the second player P2 is provided in the second play space PA2 spaced apart from the first player P1 in the first direction in the real world, an image may be provided in which the first character C1 moves toward the second character C2 located in the second direction in the virtual environment VW.

For example, when the first player P1 moves in the second direction in a state in which the second player P2 is provided in the second play space PA2 spaced apart from the first player P1 in the first direction in the real world, a virtual image in which the first character C1 moves to the position of the second character C2 may be provided through the wearable display device 400 to the first player P1.

In another example, when the first player P1 moves in the second direction in a state in which the second player P2 is provided in the second play space PA2 spaced apart from the first player P1 in the first direction in the real world, a virtual image in which the first character C1 moves toward the second character C2 in the second direction may be provided to the second player P2 through the wearable display device 400.

Figure 21:
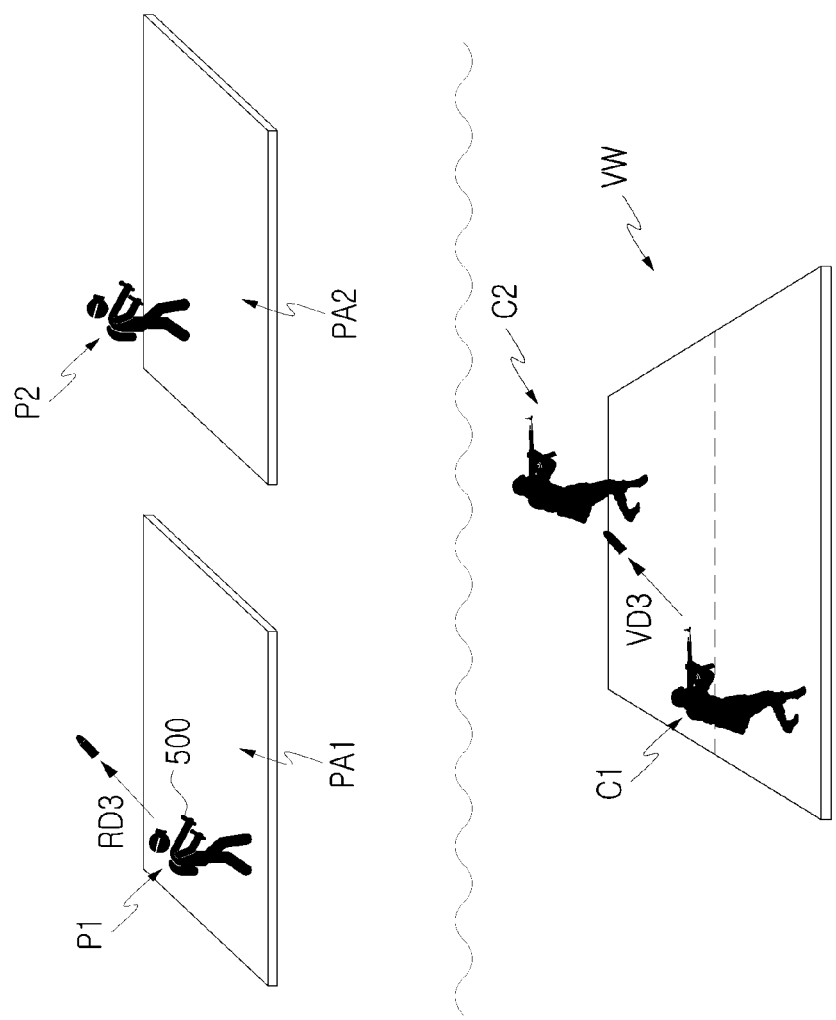
FIG. 21 is a diagram illustrating an example of a shooting situation in registration of divided spaces according to one embodiment.

FIG. 21 is a diagram illustrating an example of a shooting situation in registration of divided spaces according to one embodiment.

The first play space PA1 and the second play space PA2 may be spaced apart from each other and provided independently.

In addition, a first player P1 may play in the first play space PA1 and a second player P2 may play in the second play space PA2.

Also, a first virtual environment area VA1 corresponding to the first play space PA1 and a second virtual environment area VA2 corresponding to the second play space PA2 may be provided in a virtual environment V1.

Referring to FIG. 21, the first play space PAI and the second play space PA2 may be provided spaced apart from each other in a first direction.

Therefore, a play space PA is not provided in a third direction VD3 perpendicular to the first direction so a player P1 may not exist in the third direction VD3.

Referring to FIG. 21, the first player P1 playing in the first play space PA1 may orient a carrying input device 400 toward the third direction RD3 and may command generation of a predetermined event in the third direction RD3 by operating the input device 400.

For example, the first player P1 playing in the first play space PAI may fire to the left side by directing the input device 400 toward the left and pressing a switch provided on the input device 400.

In addition, a virtual image VI in which a predetermined event is generated in the third direction RD3 may be provided to the first player through the wearable display device 400 worn by the first player P1.

For example, the virtual image VI in which the first character C1 orients a gun toward the left side and a bullet is fired in the directed direction may be provided to the first player P1 through the wearable display device 400 worn by the first player P1.

As described above with reference to FIG. 21, there is no player P1 in the third direction VD3 in the real world, and thus another player may not be positioned in the direction aimed at by the first player.

Through the registration of divided spaces, a second character C2 corresponding to the second player P2 may be located in the direction in which the first character C1 corresponding to the first player P1 fires the bullet in the virtual environment VW, and thus the second character C2 may be shot by the bullet fired by the first character C1.

Accordingly, when the second character C2 is positioned in the direction in which the first character C1 is oriented in the virtual environment VW, although the second player P2 is not positioned in a direction in which the first player P1 orients the input device 400 in the real world, the first player P1 may shoot the second player P2.

For example, in a case where the first player P1 inputs a command for firing a bullet by orienting the input device 400 in a specific direction in the real world, although the second player P2 is not positioned in the direction in which the input device 500 is oriented, when the second character C2 is positioned in the direction in which the input device 400 is oriented in the virtual environment VW, a virtual image provided to the first player through the wearable display device 400 worn by the first player P1 may show that the second character C2 is shot by a bullet fired by the first character C1.

In another example, in a case where the first player P1 inputs a command for firing a bullet by orienting the input device 400 in a specific direction in the real world, although the second player P2 is not positioned in the direction in which the input device 400 is oriented, when the second character C2 is positioned in the direction in which the first character C1 is oriented in the virtual environment VW, a virtual image provided to the second player P2 through the wearable display device 400 worn by the second player P2 may show that the second character C2 is shot by a bullet fired by the first character C1.

Figure 22:
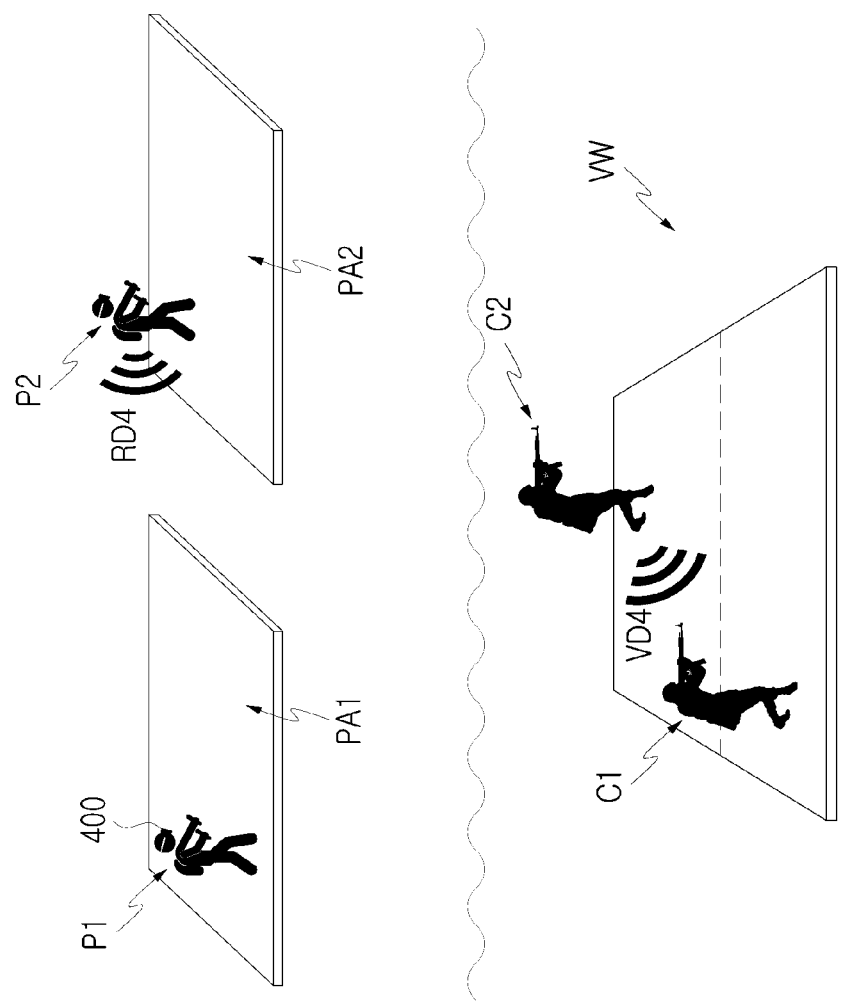
FIG. 22 is a diagram illustrating an example of sound matching in registration of divided spaces according to one embodiment.

FIG. 22 is a diagram illustrating an example of sound matching in registration of divided spaces according to one embodiment.

A first play space PA1 and a second play space PA2 may be spaced apart from each other and provided independently.

As shown in FIG. 22, the second play space PA2 may be provided spaced apart from the first play space PA1 in a first direction in the real world.

In addition, a first player P1 may play in the first play space PA1 and a second player P2 may play in the second play space PA2.

In addition, as shown in FIG. 22, the second player P2 may be positioned in the second play space PA2 provided spaced apart from the first player P1 in the first direction.

A sound generated by the second player P2 in the real world may be recognized by the first player P1 as a sound generated in the first direction.

In a virtual environment VW, a second character C2 corresponding to the second player P2 may be positioned in a third direction VD3 of a first character C1 corresponding to the first player P1, and a sound generated by the second player P2 to be provided to the first player PA1 may be output such that that the first player PA1 recognizes the sound as a sound generated in the third direction in which the second character C2 is positioned.

For example, in a case where the second player P2 is located at a position spaced apart from the first player P1 in the first direction in the real world and the second character C2 is located at a position spaced apart from the first character C1 in the third direction in the virtual environment, the sound generated by the second player P2 spaced apart from the first player P1 in the first direction in the real world may be output through a wearable display speaker 460 positioned at the left side corresponding to the third direction in which the second character C2 is positioned in the virtual environment among left and right display speakers 460 of the wearable display device 400.

According to one embodiment, an auxiliary computing device 300 may acquire output sound data, which is related to the sound generated by the second character C2, to the first player P1 on the basis of the positional relationship between the first character C1 and the second character C2 in the virtual environment.

According to one embodiment, the wearable display device 400 may provide input sound data acquired through a wearable display sound sensor module 432 to the auxiliary computing device 300.

In addition, the wearable display device 400 may provide the input sound data, which is included in identification data assigned to the wearable display device 400, to the auxiliary computing device 300.

Also, the auxiliary computing device 300 may provide the input sound data acquired by the wearable display device 400 to a server 200.

The server 200 may identify the wearable display device 400 and/or the player P that provides the input sound data on the basis of the identification data of the wearable display device 400 which is included in the input sound data.

The server 200 may provide the input sound data including the identification data related to the wearable display device 400 and/or the player P to the auxiliary computing device 300.

The auxiliary computing device 300 may acquire output sound data on the basis of the input sound data and a positional relationship between a character C corresponding to the player P that has provided the input sound data, and a character C corresponding to the player P who is to receive the sound.

For example, in a case where the first player P1 is positioned at coordinates PA1 (Xa, Ya, Za) in the first play space PA1 and the second player P2 is positioned at coordinates PA2 (Xb, Yb, Zb) in the second play space PA2, the auxiliary computing device 300 may acquire coordinates VA1 (Xa, Ya, Za) of the first character C1 corresponding to the first player P1 in the virtual environment on the basis of the coordinates of the first player P1 in the first play space PA1 and acquire coordinates VA2 (Xb, Yb, Zb) of the second character C2 corresponding to the second player P2 in the virtual environment on the basis of the coordinates of the second player P2 in the second play space PA2.

For example, when a result of determination of the positions of the first character C1 and the second character C2 in the virtual environment indicates that the second character C2 is positioned to the left side of the first character C1, the auxiliary computing device 300 may acquire output sound data such that a sound input through the wearable display sound sensor module 432 is to be output as a sound generated to the left side of the first player P1 by the wearable display speaker 460 through 3D sound.

In addition, the auxiliary computing device 300 may provide the acquired sound data to the wearable display device 400, and the wearable display device 400 may output a sound signal through the wearable display sound sensor module 432 on the basis of the acquired output sound data.

According to one embodiment, a method of the auxiliary computing device 300 to acquire output sound data in order to provide a sound input through the wearable display sound sensor module 432 provided in the wearable display device 400 worn by the player P may be different from a method of acquiring output sound data in order to provide a signal input through a sound sensor module (not shown) separately connected to the server 200 to the players P.

According to one embodiment, the auxiliary computing device 300 may acquire 3D sound-based output sound data including a direction of the sound on the basis of the position data of the players P, as described above, in order to provide the sound input through the wearable display sound sensor module 432 provided in the wearable display device 400 worn by the player P.

In addition, the auxiliary computing device 300 may acquire 2D sound data, which does not include a direction of the sound unlike the method of providing the sound between the players P, in order to provide a signal input through the sound sensor module (not shown) separately connected to the server 200.

Figure 23:
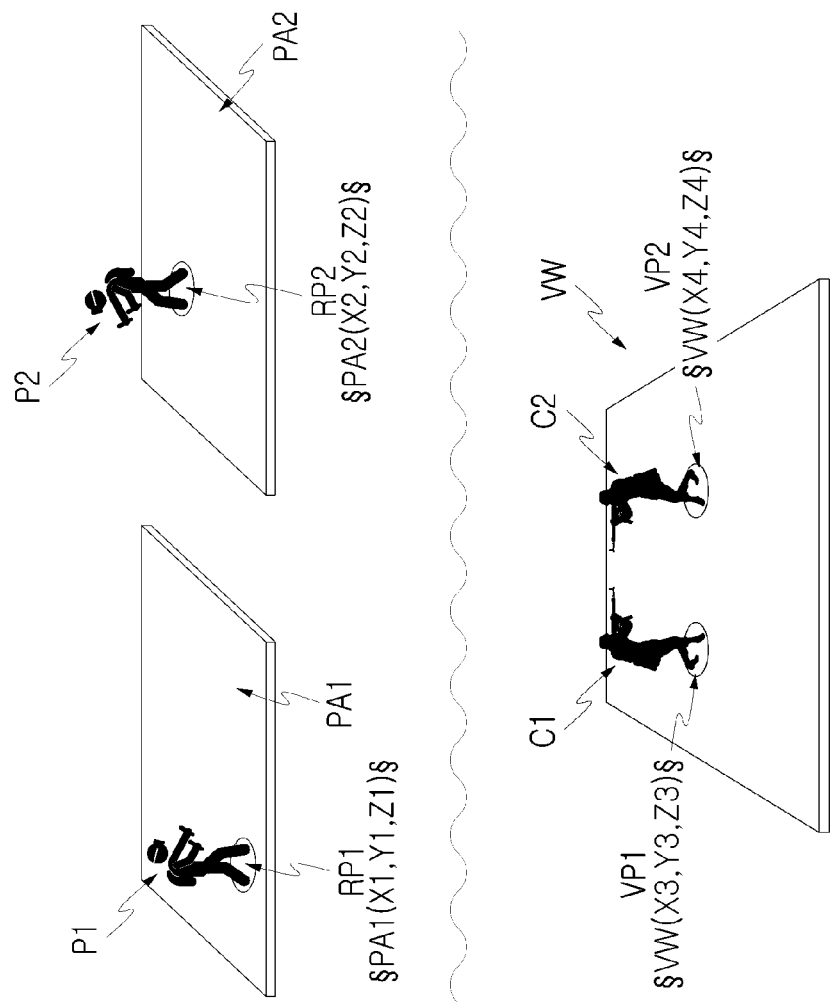
FIG. 23 is a diagram illustrating registration of divided spaces into the same space according to one embodiment.

FIG. 23 is a diagram illustrating registration of divided spaces into the same space according to one embodiment.

A first play space PA1 and a second play space PA2 may be spaced apart from each other and provided independently.

As shown in FIG. 23, the second play space PA2 may be provided in front of the first play space PA1 in the real world.

In addition, a first player P1 may play in the first play space PA1 and a second player P2 may play in the second play space PA2.

As shown in FIG. 23, the second player P2 may be located ahead of the first player P1.

In a virtual environment VW, the two play spaces PA may overlap each other and be provided as a single virtual environment VW.

For example, in the case where the first player P1 is positioned at the center of the first play space PA1 and the second player P2 is positioned at the center of the second play space PA2, positions of a first character C1 and a second character C2 may overlap in the virtual environment.

Thus, the first play space PA1 and the second play space PA2 may be provided to share one virtual environment VA.

For example, when the first player P1 is positioned at (X, Y, Z) in the first play space PA1 and the second player P2 is positioned at (X, Y, Z) in the second play space PA2, the first character C1 and the second character C2 may be provided at the same position in the virtual environment VW.

When the first character C1 and the second character C2 are provided at the same position in the virtual environment, the positions thereof may overlap each other and interference in play may be caused.

According to one embodiment, when the coordinates of the first character C1 are the same as those of the second character C2 in the virtual environment, the auxiliary computing device 300 may correct at least one of the coordinates of the first character C1 and the second character C2 in the virtual environment so that the first character C1 and the second character C2 do not overlap each other in the virtual environment.

For example, the auxiliary computing device 300 may correct the coordinates of the first character C1 and the second character C2 in the virtual environment by adding or subtracting a predetermined coordinate value to or from the virtual environment coordinates of the first character C1 and the second character C2.

More specifically, when the coordinates of the first character C1 and the second character C2 are (10, 10, 10) in the virtual environment, the coordinates of the first character C1 in the virtual environment may be obtained as (5, 10, 10) by subtracting 5 from an X-axis coordinate value of the coordinates in the virtual environment and the coordinates of the second character C2 in the virtual environment may be obtained as (15, 10, 10) by adding 5 to an X-axis coordinate value.

In another specific example, in a case where the coordinates of the first character C1 and the second character C2 are (10, 10, 10) in the virtual environment, the coordinates of the first character C1 with a higher priority may not be corrected and coordinates (15, 10, 10) may be obtained by adding 5 to an X-axis coordinate value of the second character C2 with a lower priority in the virtual environment.

Figure 24:
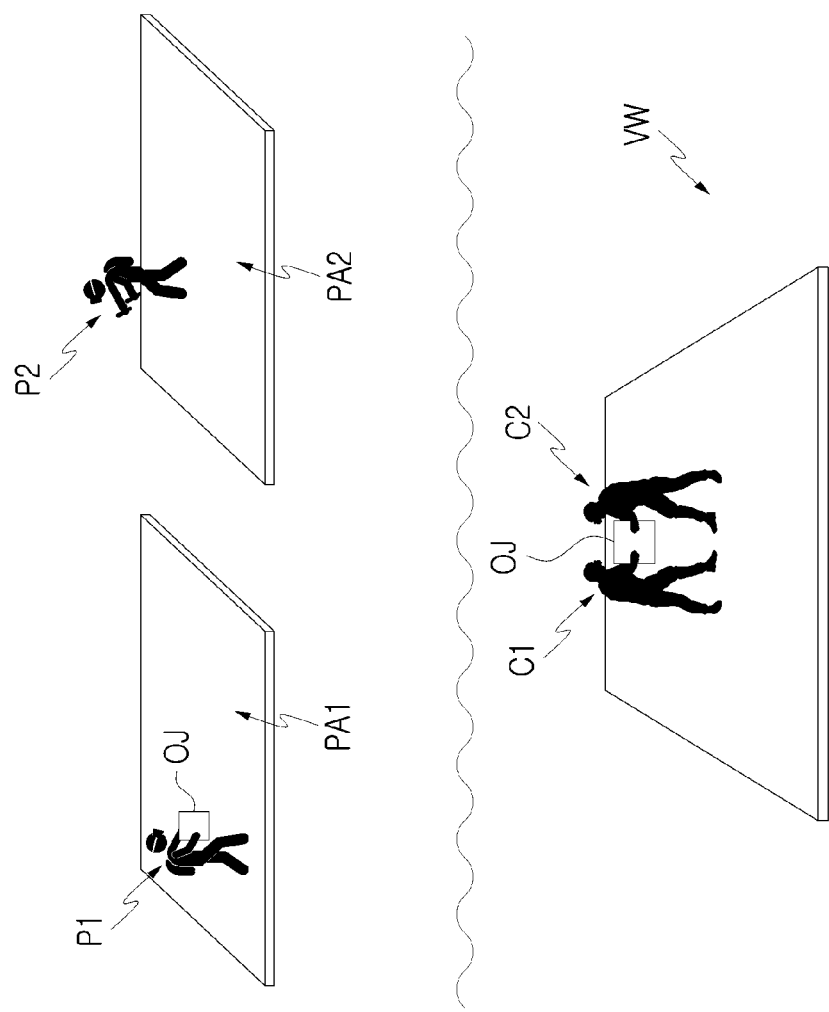
FIG. 24 is a diagram illustrating a collaborating object in registration of divided spaces according to one embodiment.

FIG. 24 is a diagram illustrating a collaborating object in registration of divided spaces according to one embodiment.

As shown in FIG. 24, the second play space PA2 may be provided in front of the first play space PA1 in the real world.

In addition, a first player P1 may play in the first play space PA1 and a second player P2 may play in the second play space PA2.

As shown in FIG. 24, the second player P2 may be positioned ahead of the first player P1.

In a virtual environment VW, the two play spaces PA may overlap each other and be provided as a single virtual environment VW.

As shown in FIG. 24, the first player P1 may carry an object OJ.

Even when the first player P1 and the second player P2 are spaced apart from each other, the first player P1 and the second player P2 may share the object OJ.

The first character C1 may be output as carrying the object OJ in the virtual environment VW.

In a virtual image provided to the second player P2 through a wearable display device 400, the first character C1 may be output as carrying the object OJ.

In the real world, the second player P2 may not touch the object OJ, but the second character C2 may touch the object OJ in the virtual reality.

Alternatively, the first character C1 corresponding to the first player P1 may carry a virtual object OJ in the virtual reality.

The first character C1 and the second character C2 may share the virtual object provided in the virtual environment.

According to one embodiment, a marker may be provided on the object OJ.

A server 200 may determine a position of the object OJ in the play space PA on the basis of detecting data.

For example, when a pattern corresponding to the object OJ is detected from detecting data acquired from a detecting device 100 regarding the first play space PA1, the server 200 may determine that the object OJ is provided in the first play space PA1 and acquire reality position data of the object OJ in the first play space PA1.

In addition, the server 200 may acquire virtual position data of the object OJ on the basis of the reality position data of the object OJ.

In addition, the server 200 may provide the virtual position data of the object OJ to the auxiliary computing device 300.

The auxiliary computing device 300 may render a virtual object corresponding to the object OJ.

For example, the auxiliary computing device 300 may render a box corresponding to the object OJ and acquire a virtual image including the rendered box.

The auxiliary computing device 300 may render the virtual object on the basis of a type of the object OJ.

According to one embodiment, the auxiliary computing device 300 may determine the type of the object OJ on the basis of a type of a pattern of a marker M provided on the object OJ and render the virtual object according to the determined type of the object OJ.

For example, the auxiliary computing device 300 may render a pre-stored soccer ball virtual object when it is determined that the object OJ is a soccer ball on the basis of the type of the pattern of the marker M provided on the object OJ.

In addition, the auxiliary computing device 300 may be connected to a separate haptic device.

For example, the auxiliary computing device 300 may be connected to a haptic device in the form of gloves worn on the user's hands and a haptic device in the form of a vest worn on the user's body.

According to one embodiment, the auxiliary computing device 300 may provide haptic feedback to the player P through the haptic device on the basis of whether the player P is in contact with the virtual object.

The auxiliary computing device 300 may determine a positional relationship between the virtual object and the player P in the virtual environment.

For example, the auxiliary computing device 300 may determine that the character C is in contact with the virtual object when it is determined that a hand of the player P is positioned within a predetermined range of a distance to the virtual object on the basis of at least one of the reality position data and the virtual position data.

When it is determined that the character C is in contact with the virtual object in the virtual environment, the auxiliary computing device 300 may control the haptic device to provide corresponding haptic feedback.

Figure 25:
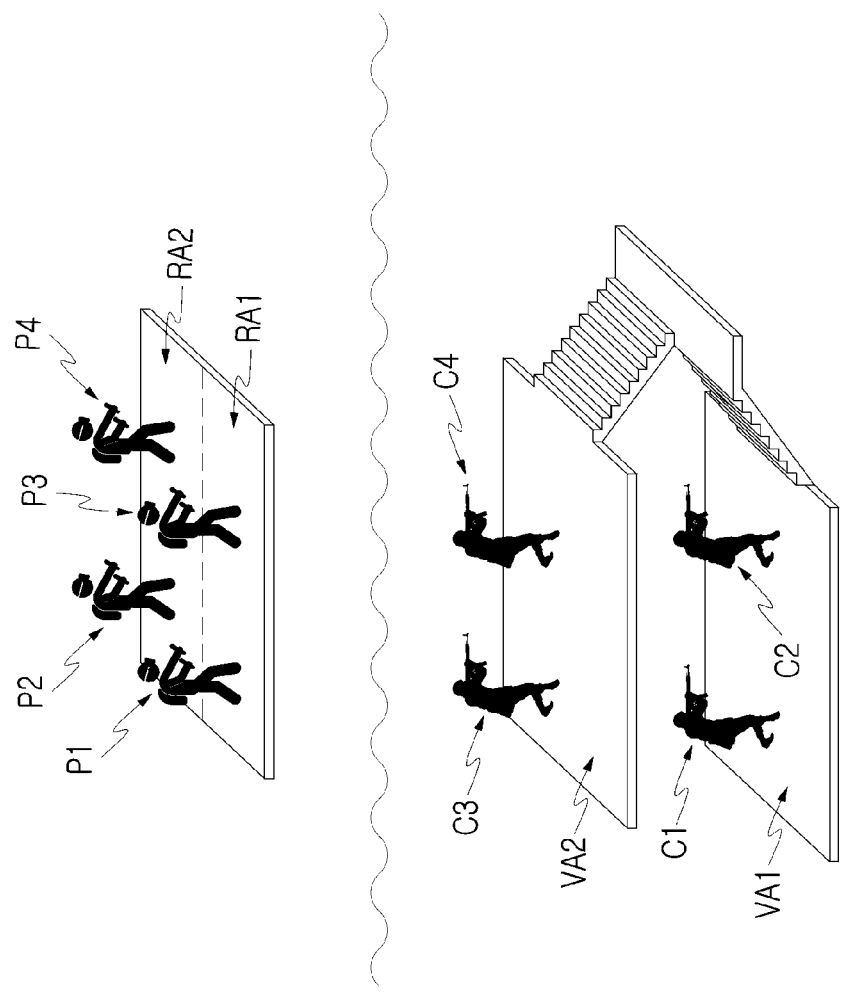
FIG. 25 is a diagram illustrating registration of divided spaces according to another embodiment.

FIG. 25 is a diagram illustrating registration of divided spaces according to another embodiment.

Referring to FIG. 25, a first play space PA1 and a second play space PA2 may be provided.

The first play space PA1 and the second play space PA2 may be provided by dividing a single play space PA.

A detecting system 100 may be provided in the play space PA.

The detecting system 100 may acquire detecting data related to the first play space PA1 and the second play space PA2.

In addition, a first player group may play in the first play space PA1 and a second player group may play in the second play space PA2.

For example, a first player P1 and a second player P2 may play in the first play space PA1 and a third player P3 and a fourth player P4 may play in the second play space PA2.

In a virtual environment, characters corresponding to the first player P1 and the second player P2, who play in the first play space PA1, and characters corresponding to the third player P3 and the fourth player P4, who play in the second play space PA2, may be provided.

In the virtual environment, characters corresponding to the first player group may be positioned on the first floor corresponding to the first play space PA1 and characters corresponding to the second player group may be positioned on the second floor corresponding to the second play space PA2.

For example, when the virtual environment is provided with a plurality of floors, such as the first floor, the second floor, the third floor, and the fourth floor, the characters corresponding to the first player group may be provided on the second floor of the virtual environment and the characters corresponding to the second player group may be provided on the third floor.

More specifically, a server 200 may acquire coordinates (10, 10, 10) of PA1, which is reality position data of the first player P1 playing in the first play space PA1, and coordinates (10, 10, 10) of PA2, which is reality position data of the second player P2 playing in the second play space PA2, on the basis of detecting data.

In addition, the auxiliary computing device 300 may acquire virtual position data of a first character C1 corresponding to the first player P1 and virtual position data of a second character C2 corresponding to the second player P2 on the basis of the reality position data acquired from the server 200 regarding the first player P1 and the second player P2.

When the first play space PA1 is the first floor, the auxiliary computing device 300 may acquire the virtual position data of the first character C1 as VA1 (10, 10, 10), and when the second play space PA2 is the second floor, may acquire the virtual position data of the second character C2 as VA1 (10, 10, 20) by changing a Z-axis coordinate value of PA2 (10, 10, 10), which is the reality position data of the second player P2 in the second play space PA2, into a coordinate value corresponding to the second floor.

Thus, even when the first play space PA1 and the second play space PA2 are provided on the same floor, a first virtual area VA1 corresponding to the first play space PA1 and a second virtual area VA2 corresponding to the second play space PA2 may be provided on different floors in the virtual environment.

Figure 26:
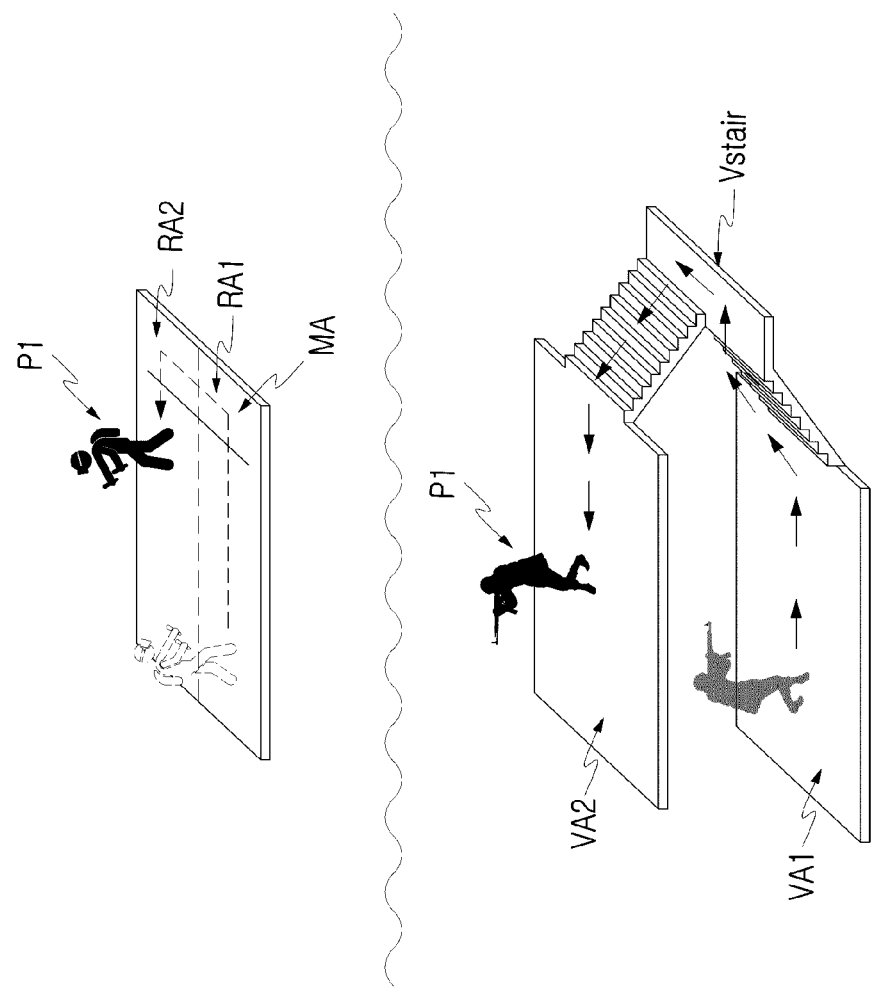
FIG. 26 is a diagram illustrating movement to another floor in registration of divided spaces according to another embodiment.

FIG. 26 is a diagram illustrating movement to another floor in registration of divided spaces according to another embodiment.

As shown in FIG. 26, a play space PA may be provided in the real world, and the play space PA may include a first play space PA1, a second play space PA2, and a move area MA.

In a virtual environment, a first virtual area VA1 corresponding to the first play space PA1 may be provided on the first floor and a second virtual area VA2 corresponding to the second play space PA2 may be provided on the second floor.

When a first player P1 moves from the first play space PA1 to the second play space PA2 through the move area MA, a first character C1 provided in the virtual environment may move from the first virtual area VA1 to the second virtual area VA2.

Thus, the first character C1 provided in the virtual environment may move from the first floor to the second floor in the virtual environment.

For example, as shown in FIG. 26, a virtual stair Vstair connecting the first virtual area VA1 and the second virtual area VA2 may be provided in the virtual environment.

When the first player P1 moves from the first play space PA1 to the second play space PA2, the first character C1 may move from the first virtual area VA1 to the second virtual area VA2 along the virtual stair Vstair connecting the first virtual area VA1 and the second virtual area VA2 provided in the virtual environment.

The movement to another floor in the virtual environment through the move area MA according to one embodiment may not be limited to the virtual stair Vstair connecting the first virtual area VA1 and the second virtual area VA2 in the virtual environment, and various types of moving methods may be provided.

According to one embodiment, a virtual elevator corresponding to the move area MA may be provided in the virtual environment.

For example, when the first player P1 moves from the first play space PA1 to the move area MA, the first character C1 in the virtual environment may board a virtual elevator provided in an area corresponding to the move area MA. In addition, a virtual object through which the player can choose a desired floor may be provided in the virtual elevator.

The auxiliary computing device 300 may determine that a desired floor is selected when the first player P1 places a hand or an input device 500 at a position in the real world corresponding to the desired floor provided in the virtual environment or when the first player P1 inputs predetermined selection by orienting the input device 500 in a specific direction.

The auxiliary computing device 300 may provide a virtual image showing that the virtual elevator is moving to the corresponding floor to a wearable display device 400.

The auxiliary computing device 300 may acquire a virtual image corresponding to the second play space PA2 in the virtual environment and provide the acquired virtual image to the wearable display device 400.

According to one embodiment, when the first player P1 moves from the move area MA to the second play space, the auxiliary computing device 300 may provide a virtual image corresponding to the second play space to the wearable display device 400.

According to one embodiment, when the virtual elevator moves to the corresponding floor, the auxiliary computing device 300 may provide a virtual image corresponding to the second play space PA2 to the wearable display device 400.

According to one embodiment, when the virtual elevator moves to the corresponding floor and a door of the virtual elevator opens, the auxiliary computing device 300 may provide a virtual image corresponding to the second play space PA2 to the wearable display device 400.

The auxiliary computing device 300 may provide a virtual image corresponding to a corresponding floor.

According to one embodiment, when the virtual elevator moves to the third floor and the user moves to the second play space PA2, the auxiliary computing device 300 may provide a virtual image corresponding to the third floor.

According to one embodiment, when the virtual elevator moves to the third floor and the door of the virtual elevator opens, the auxiliary computing device 300 may provide a virtual image corresponding to the third floor.

The auxiliary computing device 300 may provide a virtual image that is different from virtual images of other floors for at least some of a plurality of floors provided through the virtual elevator.

For example, the first floor and the second floor may be provided with virtual environments of different backgrounds so that virtual images for the first floor and the second floor may be different from each other.

Referring to FIG. 26, a virtual image that the auxiliary computing device 300 provides to the wearable display device 400 when the first player P1 in the move area MA selects the second floor in the virtual elevator and then moves to the second play space PA2 may be different from a virtual image that the auxiliary computing device 300 provides to the wearable display device 400 when the first player P1 in the move area MA selects the third floor in the virtual elevator and then moves to the second play space PA2.

In addition, according to one embodiment, a real object may be provided in the move area MA.

For example, the real object provided in the move area MA may include a real object, such as a button, a switch, a stick, and or the like, through which the user can input selection.

In addition, a marker may be provided on the object.

The auxiliary computing device 300 may change a virtual space related to at least one of the first play space PA1 and the second play space PA2 on the basis of the player's manipulation of the real object.

Referring to FIG. 26, the auxiliary computing device 300 may determine the manipulation of the real object by the first player P1 on the basis of detecting data.

For example, when the first player P1 manipulates the real object provided in the move area MA, the auxiliary computing device 300 may determine a virtual space to be applied to at least one of the first play space PA1 and the second play space PA2 as a result of manipulating the real object.

More specifically, when the real object is a switch, the auxiliary computing device 300 may determine a floor selected by the first player P1 on the basis of the switch pressed by the first player P1 and apply a virtual image related to the floor selected by the first player P1 to at least one of the first play space PA1 and the second play space PA2.

Figure 27:
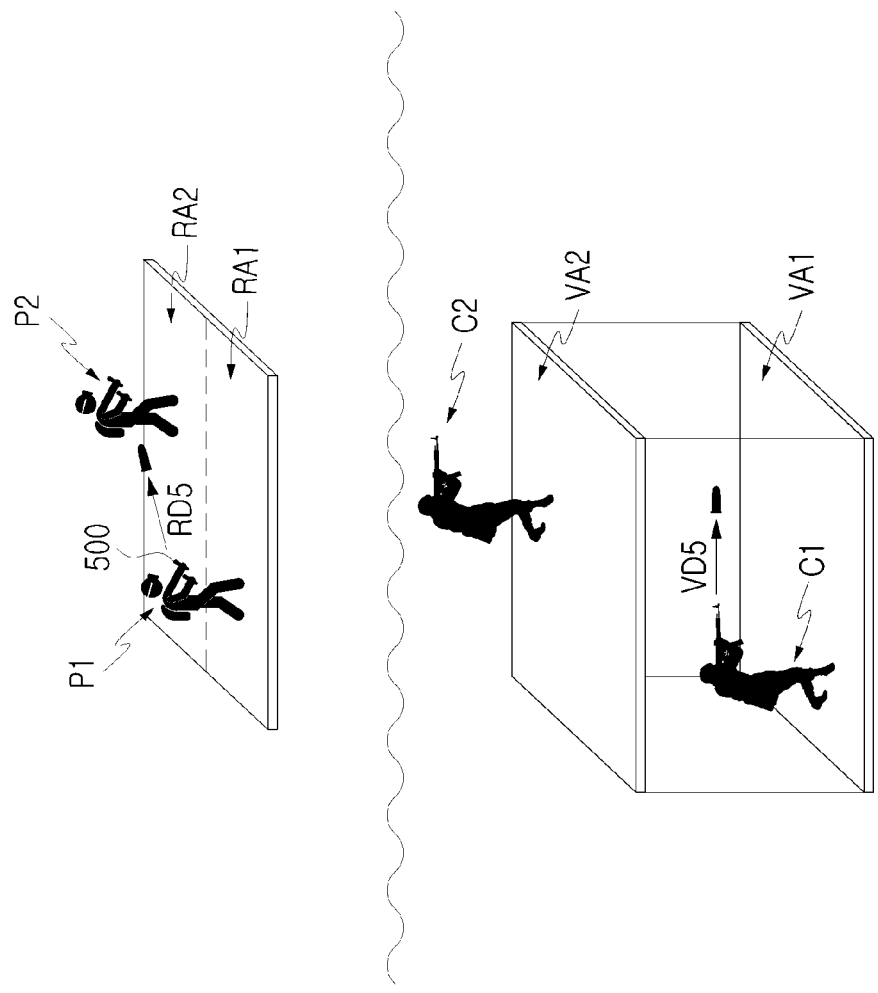
FIG. 27 is a diagram illustrating an event of being shot according to a positional relationship in registration of divided spaces according to another embodiment.

FIG. 27 is a diagram illustrating an event of being shot according to a positional relationship in registration of divided spaces according to another embodiment.

As shown in FIG. 27, a play space PA may be provided in the real world, and the play space PA may include a first play space PA1 and a second play space PA2.

In a virtual environment, a first virtual area VA1 corresponding to the first play space PA1 may be provided on the first floor and a second virtual area VA2 corresponding to the second play space PA2 may be provided on the second floor.

Referring to FIG. 27, a first player P1 playing in the first play space PA1 may orient a carried input device 400 toward a fifth direction RD5 in which a second player P2 playing in the second play space PA2 is positioned and may command generation of a predetermined event in a third direction RD3 by manipulating the input device 400.

For example, the first player P1 playing in the first play space PA1 may orient the input device 400 toward the left side in which the second player P2 playing in the second play space PA2 is positioned and may command generation of an event of firing a gun to the left side by pressing a switch provided on the input device 400.

The auxiliary computing device 300 may acquire a virtual image in which a predetermined event is generated in the fifth direction RD5 in the virtual environment corresponding to the fifth direction RD5 in which the first player P1 orients the input device 500.

For example, the auxiliary computing device 300 may acquire a virtual image in which a first character C1 fires a gun in the fifth direction RD5 in the virtual environment corresponding to the fifth direction RD5 in which the first player P1 orients the input device 500.

In the case where the first player P1 playing in the first play space PA1 fires the gun by orienting the gun toward the second player P2 located in the second play space PA2, although the first player P1 fires the gun aiming at the second player P2 in the real world, as shown in FIG. 27, the first character C1 corresponding to the first player P1 may be located on the first floor and the second character C2 corresponding to the second player P2 may be located on the second floor in the virtual environment VW.

Even when the second player P2 is located in the direction in which the first player P1 orients the input device 500 in the real world, the first player P1 may not shoot the second player P2 when the second character C2 is not located in the direction oriented to the first character C1 in the virtual environment VW.

For example, in the case where the first player P1 inputs a command for firing a bullet by orienting the input device 400 in a specific direction in the real world, although the second player P2 is positioned in the direction in which the input device 400 is oriented, when the second character C2 is not positioned in the direction in which the first character C1 is oriented in the virtual environment VW, a virtual image provided to the first player P1 through the wearable display device 400 worn by the first player P1 may not be provided with the second character C2 in the direction in which the bullet is fired.

In another example, in a case where the first player P1 inputs a command for firing a bullet by orienting the input device 400 in a specific direction, although the second player P2 is positioned in the direction in which the input device 400 is oriented, when the second character C2 is not positioned in the direction in which the first character C1 is oriented, a virtual image provided to the second player P2 provided through a wearable display device 400 worn by the second player P2 may not include a virtual image provided at the time of being shot. More specifically, a pre-existing virtual image may be provided to the second player P2, rather than a virtual image provided at the time of being shot.

Figure 28:
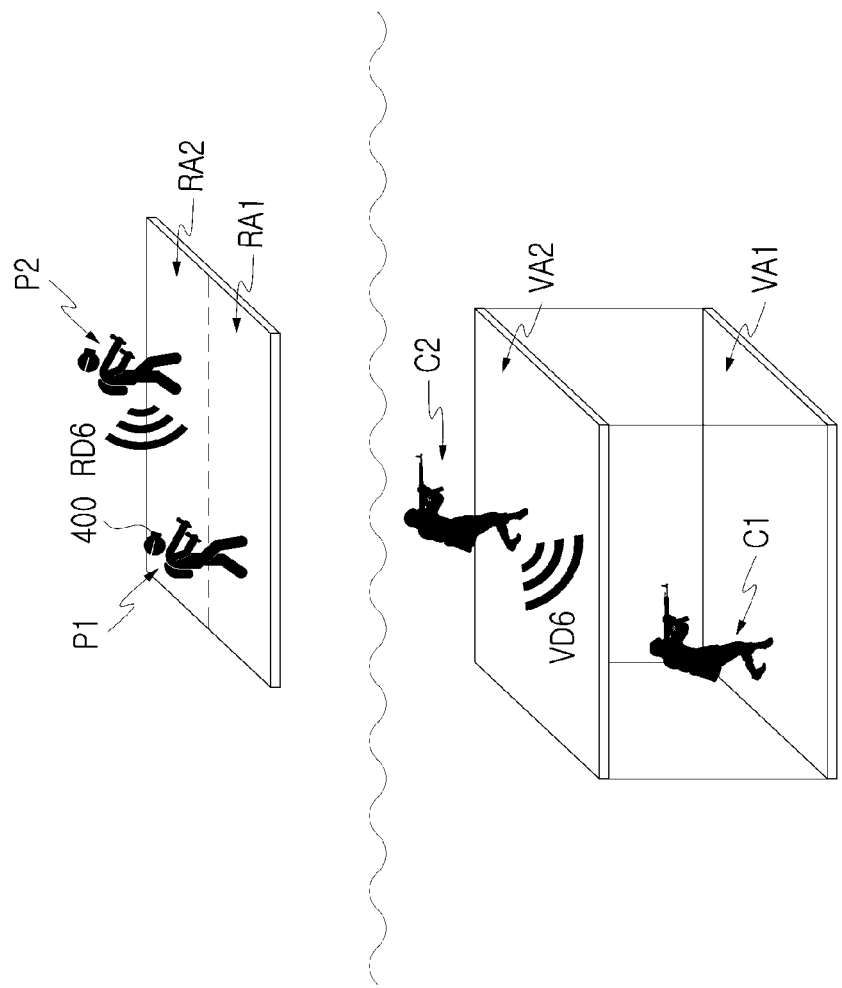
FIG. 28 is a diagram illustrating sound matching in registration of divided spaces according to another embodiment.

FIG. 28 is a diagram illustrating sound matching in registration of divided spaces according to another embodiment.

A first play space PA1 and a second play space PA2 may be spaced apart from each other and provided independently.

As shown in FIG. 28, a play space PA may be provided in the real world, and the play space PA may include a first play space PA1 and a second play space PA2.

In addition, the first play space PA1 and the second play space PA2 may be provided on the same floor.

In a virtual environment provided through a wearable display device 400, a first virtual area VA1 corresponding to the first play space PA1 may be provided on the first floor and a second virtual area VA2 corresponding to the second play space PA2 may be provided on the second floor.

In addition, a first player P1 may play in the first play space PA1 and a second player P2 may play in the second play space PA2.

For example, as shown in FIG. 28, the second player P2 may be positioned to the left side of the first player P1.

According to one embodiment, a direction of a sound output through a wearable display speaker 460 of the wearable display device 400 may differ from a direction between the players in the real world.

Referring to FIG. 28, in the real world, a sound generated by the second player P2 may be recognized by the first player P1 as a sound generated to the left side.

Thus, considering only the real world, the sound generated by the second player P2 may be output to the first player PA1 through a wearable display speaker 460 to the left side among wearable display speakers 460 provided in the right and left sides of the first player PA1.

Referring to FIG. 28, in a virtual environment V1 provided through the wearable display device 400, a first character C1 corresponding to the first player P1 may be located on the first floor and a second character C2 corresponding to the second player P2 may be located on the second floor.

Thus, the sound that is generated by the second player P2 and provided to the first player PA1 may be provided to be heard from above the first player P1.

Figure 29:
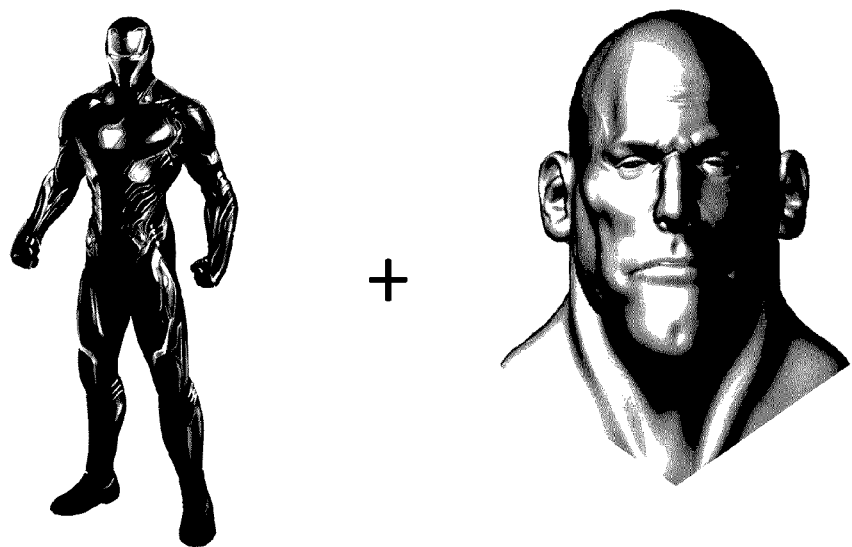
FIG. 29 is a diagram illustrating an example of face registration.

FIG. 29 is a diagram illustrating an example of face registration.

According to one embodiment, as a way of distinguishing players from each other in a virtual environment, a virtual character of a different color may be provided to each of the players and/or each of the teams to identify each player and/or each team.

For example, a first virtual character corresponding to the first player and a second virtual character corresponding to the second player may be provided with different colors so that the players can identify each other.

Alternatively, a virtual character corresponding to a player belonging to a first team may be provided with a first color and a virtual character corresponding to a player belonging to a second team may be provided with a second color so that the virtual character corresponding to the player belonging to the first team and the virtual character corresponding to the player belonging to the second team can identify each other.

According to one embodiment, identification data corresponding to each of the players and/or teams may be provided to allow the players and/or the teams to identify each other so that one player can identify each player and/or each team on the basis of the identification data.

Alternatively, the first virtual character corresponding to the first player and/or a predetermined area adjacent to the first virtual character may be provided with the first player and/or identification data related to the first virtual character and the second virtual character corresponding to the second player and/or a predetermined area adjacent to the second virtual character may be provided with the second player and/or identification data related to the second virtual character so that the first virtual character and the second virtual character can identify each other.

Alternatively, the virtual character corresponding to the player belonging to the first team and/or a predetermined area adjacent to the virtual character may be provided with identification data related to the first team and the virtual character corresponding to the player belonging to the second team and/or a predetermined area adjacent to the virtual character may be provided with identification data related to the second team so that the virtual character corresponding to the player belonging to the first team and the virtual character corresponding to the player belonging to the second team can identify each other.

In the case where each player is identified using a color, it may be difficult to identify a player when the player does not remember the color assigned to the player.

There may be a variety of ways of recognizing others in everyday life, but face recognition is most commonly used. That is, people may identify and recognize others through facial features of other people.

Such facial features may be provided in various ways. Generally, in a game, facial features may be provided uniformly for each character, or facial features may be different from one another for each virtual character but the facial features are not provided differently from one player to another player.

According to one embodiment, the facial features are provided differently from one player to another player so that it is easy to identify one player from another player.

In addition, according to one embodiment, facial features of the player are reflected in face data of the virtual character so that it is possible to more clearly identify the virtual character of the player.

Figure 30:
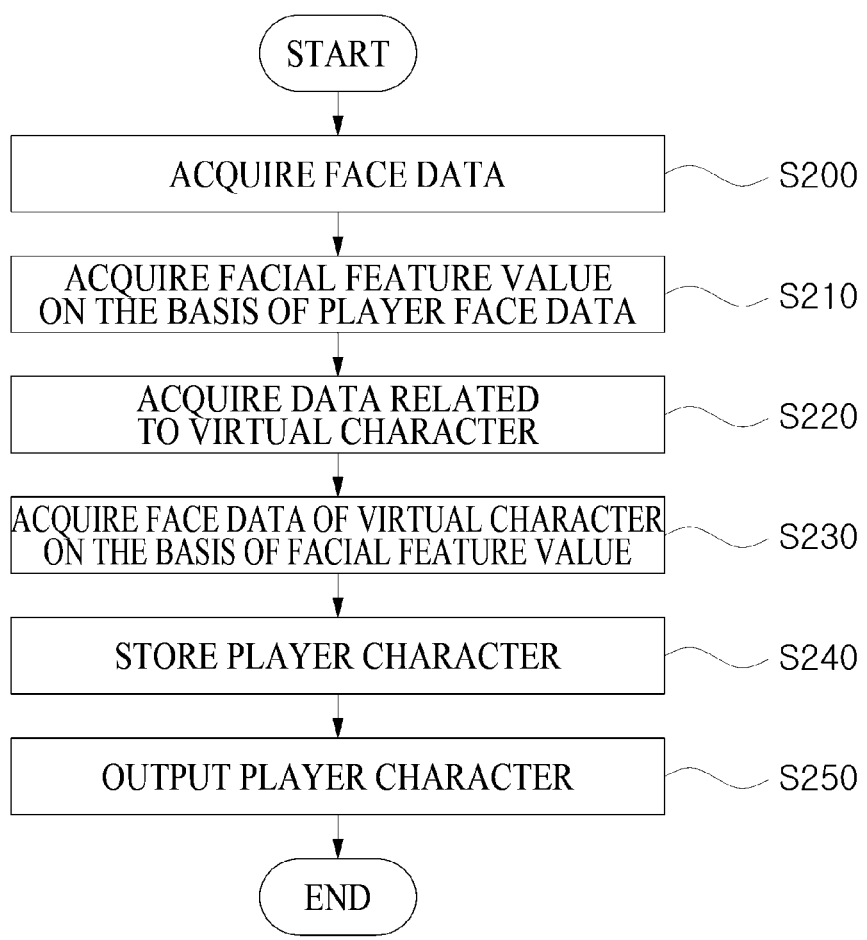
FIG. 30 is a flowchart illustrating a method of acquiring a player character according to one embodiment.

FIG. 30 is a flowchart illustrating a method of acquiring a player character according to one embodiment.

Referring to FIG. 30, the method of acquiring a player character may include acquiring player face data of a player (S200), acquiring facial feature values on the basis of the player face data (S210), acquiring data related to a virtual character (S220), acquiring face data of the virtual character on the basis of the facial feature values (S230), storing the player character (S240), and outputting the player character (S250).

According to one embodiment, the acquiring of the player face data may be performed (S200).

According to one embodiment, a virtual environment system may be provided with a face sensor 800 and the face data of a player may be acquired through the face sensor 800.

A server 200 may acquire the face data of the player in order to acquire facial feature values of the player.

Figure 31:
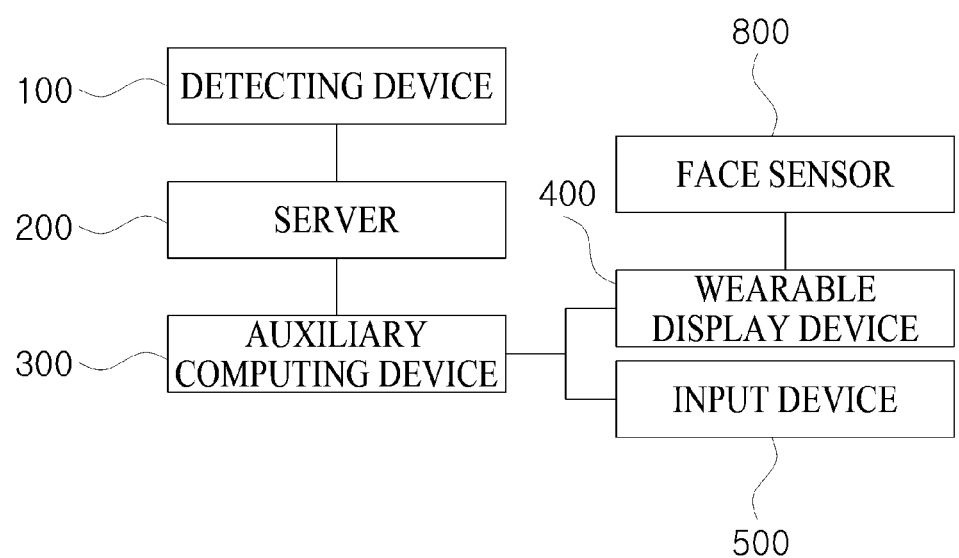
FIG. 31 is a diagram illustrating the acquisition of face data through a face sensor 800 according to one embodiment.

FIG. 31 is a diagram illustrating the acquisition of face data through a face sensor 800 according to one embodiment.

According to one embodiment, the face sensor 800 to acquire face data of the player may be provided and the face data of the player may be acquired through the face sensor 800.

According to one embodiment, the face sensor 800 may be provided as a camera, an image, or the like.

For example, when the face sensor 800 is provided as a camera, the face of the player is captured by the camera and face data related to the face of the player may be acquired.

Figure 32:
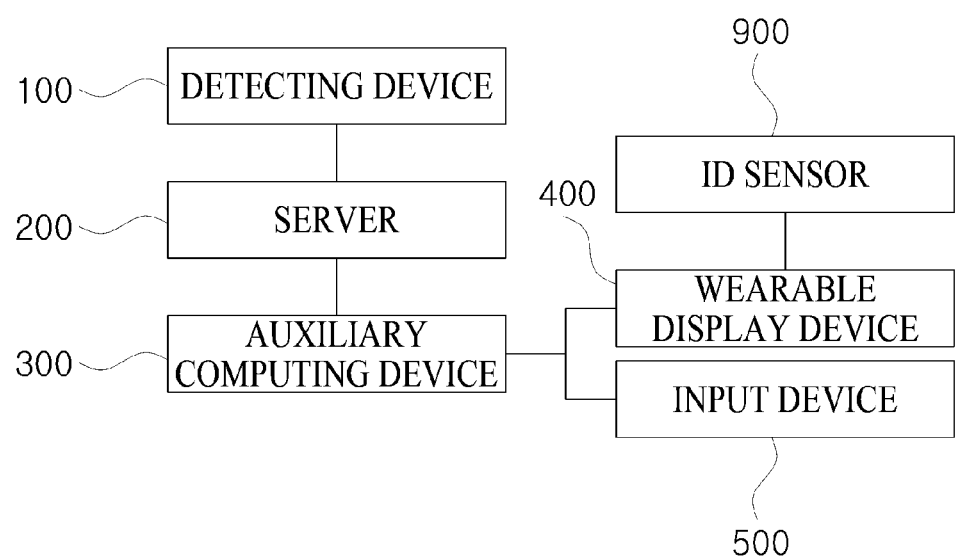
FIG. 32 is a diagram illustrating an example of face data of a player according to one embodiment.

FIG. 32 is a diagram illustrating an example of face data of a player according to one embodiment.

As shown in FIG. 32, the server 200 may acquire the face data by scanning the face of a player through the face sensor 800.

According to one embodiment, face data corresponding to acquired player identification data may be acquired from pieces of face data pre-stored in the server 200.

Figure 33:
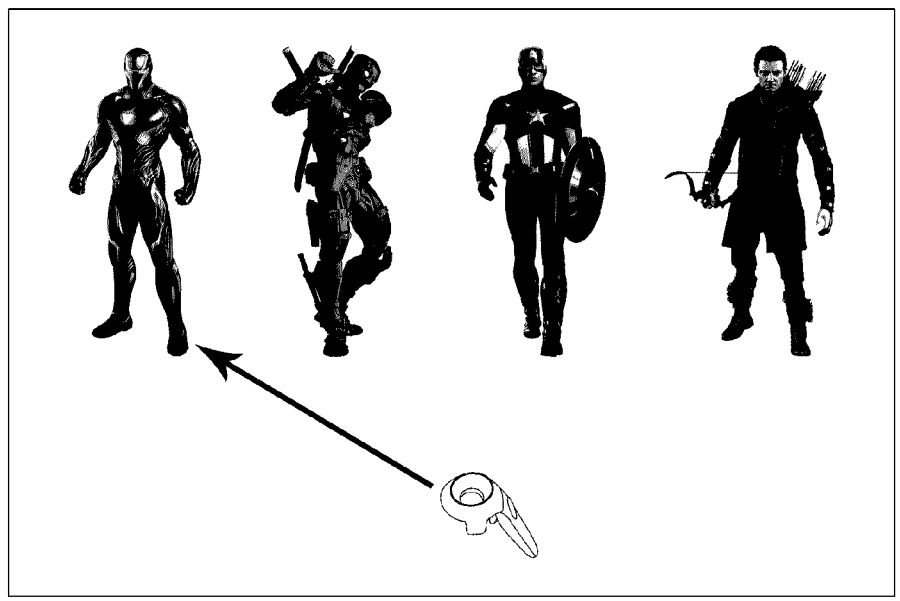
FIG. 33 is a diagram illustrating the acquisition of pre-stored face data using identification data according to one embodiment.

FIG. 33 is a diagram illustrating the acquisition of pre-stored face data using identification data according to one embodiment.

The server 200 may pre-store face data acquired through the face sensor 800.

In addition, according to one embodiment, the face data may be pre-stored in a separate face data server.

According to one embodiment, the server may acquire player identification data through an ID sensor 900.

For example, a server 200 may acquire player identification data input by a player through an input device provided to the ID sensor 900.

In another example, the server 200 may acquire the player identification data by scanning the player identification data recorded on a portable recording medium carried by the player through the ID sensor 900.

More specifically, the server 200 may acquire the player identification data by scanning barcode recorded on an ID card held by the player through a barcode reader provided to the ID sensor 900.

In addition, the server 200 may acquire player identification data input by the player through the ID sensor 900. In addition, the server 200 may acquire face data corresponding to the player identification data from among pieces of pre-stored face data.

In addition, when a separate face data server is provided, the server 200 may request the face data server to send face data corresponding to the player identification data and may acquire the face data corresponding to the player identification data from the face data server.

According to one embodiment, the server 200 may acquire face data from a portable recording medium.

According to one embodiment, the server 200 may acquire face data recorded on the portable recording medium carried by the player through the ID sensor 900.

For example, the server 200 may scan and acquire face data recorded on the portable recording medium carried by the player, through the ID sensor 900.

More specifically, the server 200 may acquire face data by scanning a barcode recorded on an ID card held by the player through a barcode reader provided in the ID sensor 900.

According to one embodiment, the acquiring of the facial feature values on the basis of the player face data may be performed (S210).

As the feature values of the face data, a value of eye color, hair color, eyebrow color, facial skin color, nose height, nose width, eye size, a distance between eyes, eye position, or the like may be acquired.

The server 200 may acquire the face data related to a virtual character by applying the acquired feature values of the face data to a virtual character face data variable value.

For example, the face data may include variable values related to nose height, nose width, eye size, a distance between eyes, and eye position, and the variable values related to the variables of the face data may be pre-stored in a server storage 220. A server controller 240 may change the pre-stored variable value of the face data to the acquired feature values of the face data.

For example, when a nose height in the acquired face data is 10 cm, the server controller 240 may set a nose height variable of virtual character face data to 10 cm.

Face data of virtual characters of the players having different feature values may be different from each other.

For example, when feature values of face data acquired from a first player are different from feature values of face data acquired from a second player, face data of a first character and face data of a second character may be different from each other.

In addition, since the face data of the first character is acquired by applying the feature values acquired from the first player, when another player views the first character, the player may identify that the first character corresponds to the first player on the basis of a characteristic appearance (e.g., a height of a nose and the like) of the first player.

The server 200 may transmit the acquired feature values to an auxiliary computing device 300.

The above-described acquisition of feature values is not necessarily performed by the server 200 and may be provided in various forms according to selection.

For example, the auxiliary computing device 300 may acquire the face data acquired in operation S100 and acquire the feature values by performing operation S200.

According to one embodiment, the acquiring of the data related to the virtual character may be performed (S220).

According to one embodiment, data related to a character selected from among a plurality of pre-stored virtual characters may be acquired.

According to one embodiment, an operation in which at least one character is selected from among the plurality of virtual characters may be provided in a virtual environment.

For example, in a predetermined step in a game, identification data related to a plurality of characters may be provided to a player.

Figure 34:
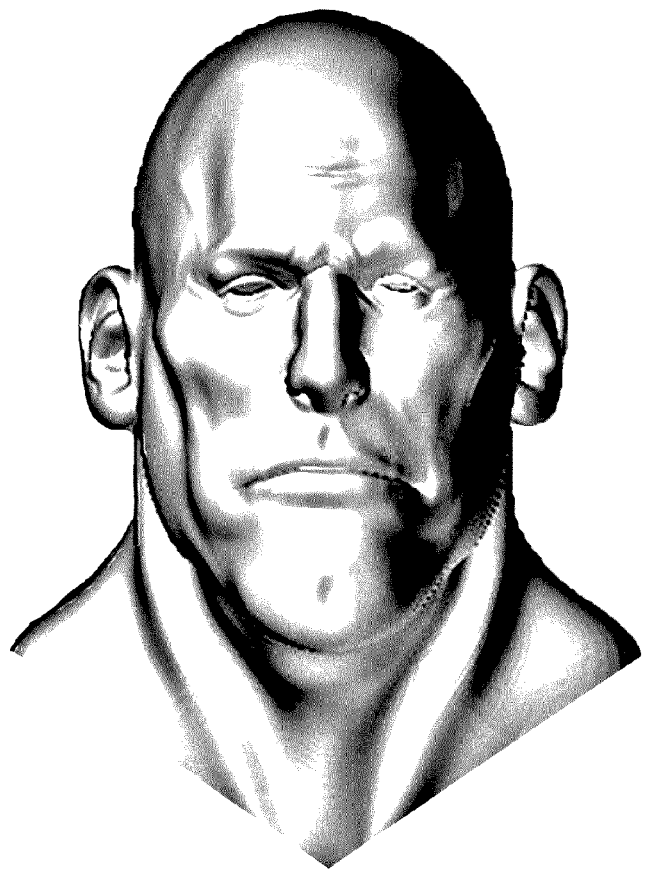
FIG. 34 is a diagram illustrating selection of a virtual character according to one embodiment.

FIG. 34 is a diagram illustrating selection of a virtual character according to one embodiment.

Referring to FIG. 34, an auxiliary computing device 300 may control a wearable display device 400 to provide an image related to a plurality of virtual characters in a virtual environment.

In addition, although not shown in FIG. 34, identification data for each of the plurality of virtual characters may be provided.

Also, the auxiliary computing device 300 may acquire a player's selection for at least one virtual character through a controller 500.

For example, the auxiliary computing device 300 may acquire a virtual character corresponding to a direction in which the controller 500 is oriented by the player as a virtual character selected by the player.

In another example, in a case where a player's input is performed by pressing a predetermined selection button provided on the controller 500, the auxiliary computing device 300 may acquire a virtual character corresponding to a direction in which the controller 500 is oriented at the time when the player's input is performed by pressing the predetermined selection button as a virtual character selected by the player.

The auxiliary computing device 300 may acquire character data related to the selected virtual character.

According to one embodiment, the character data may be data related to an appearance of a character and may be data related to a body part except for face data of a virtual character. Alternatively, the character data may include the face data of the virtual character, and the face data in which a basic feature values pre-assigned to the virtual character is set may be provided.

According to one embodiment, the acquiring of the face data of the virtual character on the basis of the facial feature values may be performed (S230).

The server 200 may acquire the face data of the virtual character on the basis of the facial feature values of the player.

According to one embodiment, the face data of the virtual character may include variable values related to eye color, hair color, eyebrow color, facial skin color, nose height, nose width, eye size, a distance between eyes, eye position, and the like.

The server 200 may acquire the face data of the virtual character by changing the variable value included in the face data of the virtual character to the feature values acquired on the basis of the face data of the player.

For example, the server 200 may acquire the face data of the virtual character by changing a variable value of a height of a nose included in the face data of the virtual character to the variable value acquired from the face data of the player.

According to one embodiment, the storing of a player character may be performed (S240).

The server 200 may acquire a virtual character on the basis of the face data of the virtual character and body data of the virtual character.

In addition, the server 200 may transmit the virtual character to the auxiliary computing device 300.

For example, the server 200 may transmit the first virtual character corresponding to the first player to a second auxiliary computing device used by the second player.

In another example, the server 200 may transmit the second virtual character corresponding to the second player to a first auxiliary computing device used by the first player.

In still another example, the server 200 may transmit the first virtual character and the second virtual character to the first auxiliary computing device and the second auxiliary computing device that are connected to the server 200.

According to one embodiment, the outputting of the player character may be performed (S250).

According to one embodiment, an image of the virtual character corresponding to one player may be output through a wearable display device 400 worn by another player.

Figure 35:
FIG. 35 is an illustration showing an example of a player character according to one embodiment.

FIG. 35 is an illustration showing an example of a player character according to one embodiment.

As shown in FIG. 35, face data of a virtual character output in a virtual environment may be provided by reflecting a feature values acquired on the basis of face data of a player.

In one example, in a case where a first player and a second player play in a virtual environment, a virtual character corresponding to the second player may be output through a wearable display device 400 worn by the first player when the virtual character corresponding to the second player appears in the field of view of the first player in the virtual environment.

In addition, when a virtual character corresponding to the first player appears in the field of view of the second player, the virtual character corresponding to the first player may be output through a wearable display device 400 worn by the second player.

When a second player character corresponding to the second player is output through a first wearable display device, face data of the virtual character corresponding to the second player may be output by reflecting feature values of the second player.

In addition, the second player character corresponding to the first player is output through a second wearable display device, face data of the virtual character corresponding to the second player may be output by reflecting feature values of the second player.

A number of the example embodiments have been described above. Nevertheless, it should be understood that various modifications may be made to these example embodiments. For example, suitable results may be achieved when the described techniques are performed in a different order and/or when components in a described system, architecture, device, or circuit are combined in a different manner and/or replaced or supplemented by other components or their equivalents.

Accordingly, other implementations are within the scope of the following claims.

The invention claimed is:

1. A virtual reality control system for providing a virtual image related to at least part of virtual environment to a player who plays in a plurality of divided spaces through a wearable display device which the player is wearing, comprising:
   at least one first detecting device getting first detecting data related to a first play space;
   at least one second detecting device getting second detecting data related to a second play space;
   at least one auxiliary computing device generating a first virtual image and a second virtual image;
   a first wearable display device displaying the first virtual image to a first player located in the first play space, wherein the first wearable display device includes a speaker outputting a sound; and
   a second wearable display device displaying the second virtual image to a second player located in the second play space;
   wherein the auxiliary computing device is,
      getting a first reality position data related to the first player based on the first detecting data,
      getting a first virtual position data, which is position data in virtual environment corresponding to the first player, based on reality position data of the first player,
      getting a second reality position data related to the second player based on the second detecting data, and
      getting a second virtual position data, which is position data in virtual environment corresponding to the second player, based on reality position data of the second player,
   wherein the speaker is,
      outputting the sound acquired by the second player to the first player in a direction of the first virtual position data based on the second virtual position data, and
   wherein the direction of the first virtual position data based on the second virtual position data is different from a direction of the first reality position data based on the second reality position data,
   wherein the first virtual image is related to an area corresponding to a field of view of a location determined based on the first virtual position data in the virtual environment, and wherein the second virtual image is related to an area corresponding to a field of view of a location determined based on the second virtual position data in the virtual environment, wherein the first play space and the second play space are provided on a same floor, and when the first character is located on a first floor and the second character is located on a second floor different from the first floor in the virtual environment, the sound acquired by the second player is outputted to the first player so that a type of the sound indicates a floor different from the first floor.

2. The system of claim 1,
wherein a distance between the first player and the second player, determined based on the first reality position data and the second reality position data, and a distance between the first character and the second character in the virtual environment, determined based on the first virtual position data and the second virtual position data, are different each other.

3. The system of claim 2,
wherein the first reality position data, the second reality position data, the first virtual position data and the second virtual position data include a coordinate value,
wherein a difference between coordinate values of the first reality position data and the second reality position data differs from a difference between coordinate values of the first virtual position data and the second virtual position data.

4. The system of claim 1,
wherein the first play space and the second play space are provided by being arranged with a first direction, and
wherein a first virtual area corresponding to the first play space and a second virtual area corresponding to the second play space are provided with a second direction in the virtual environment.

5. The system of claim 4,
wherein the first virtual image includes the second character corresponding to the second player when the first wearable display device is oriented to the second direction which differs from the first direction where the second player is located.

6. The system of claim 4,
wherein the system further includes an input device provided to the first player,
wherein when a command about a predetermined event is obtained as the input device is oriented to the second direction which differs from the first direction where the second player is located, the first virtual image is an image of a first character, corresponding to the first player, performing the predetermined event, and
wherein the second virtual image is an image of an effect given to the second character corresponding to the second player according to the predetermined event.

7. The system of claim 1,
wherein the first play space and the second play space are provided by being arranged with a first direction, and
wherein the virtual environment includes a virtual area corresponding to the first play space and the second play space.

8. The system of claim 7,
wherein the first reality position data and the second reality position data include a coordinate value about a plurality of axes, and
wherein a second character corresponding to the second player provided to the first virtual image is provided within a same axis of a first character corresponding to the first player when the first reality position data and the second reality position data have a same coordinate value about a same axis.

9. The system of claim 8,
wherein the system further includes an object which the first player possesses,
wherein the second virtual image includes an image of the first character possessing a virtual object corresponding to the object, and
wherein the second virtual image is provided as an image of the second character touching the virtual object corresponding to the object when a hand of the second player moves to a position corresponding to a position of the object.

10. A wearable display device for providing a virtual image related to at least part of virtual environment to a player who plays in a plurality of divided spaces, comprising;
a communicator getting data about an other player;
a display displaying a virtual image to the player;
a speaker outputting a sound to the player; and
a controller controlling an output of the virtual image of the display;
wherein the virtual image displayed through the display includes an image related to a first virtual area corresponding to a first play space where the player wearing the wearable display device plays and an image related to a second virtual area corresponding to a second play space where at least one other player except the player plays,
wherein the virtual image is obtained from an auxiliary computing device connected to the communicator,
wherein the auxiliary computing device is,
getting a first reality position data related to the player,
getting a first virtual position data, which is position data in virtual environment of a first character corresponding to the player, based on the first reality position data related to the player,
getting a second reality position data related to the other player, and
getting a second virtual position data, which is position data in virtual environment of a second character corresponding to the other player, based on the second reality position data related to the other player,
wherein the speaker is,
outputting the sound acquired by the other player to the player in a direction of the first virtual position data based on the second virtual position data, and
wherein the direction of the first virtual position data based on the second virtual position data is different from a direction of the first reality position data based on the second reality position data, and
wherein the first play space and the second play space are provided on a same floor, and when the first character is located on a first floor and the second character is located on a second floor different from the first floor in the virtual environment, the sound acquired by the other player is outputted to the player so that a type of the sound indicates a floor different from the first floor.

11. The wearable display device of claim 10,
wherein a distance between the second character corresponding to the other player and the first character corresponding to the player provided to the virtual image is differently provided compared to a distance between the player and the other player.

\* \* \* \* \*